(12) United States Patent
Hayashi

(10) Patent No.: US 7,539,859 B2
(45) Date of Patent: May 26, 2009

(54) PIPELINE PROCESSING SYSTEM AND INFORMATION PROCESSING APPARATUS

(75) Inventor: Tsuneo Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 798 days.

(21) Appl. No.: 10/902,964

(22) Filed: Jul. 30, 2004

(65) Prior Publication Data

US 2005/0058438 A1 Mar. 17, 2005

(30) Foreign Application Priority Data

Jul. 31, 2003 (JP) ............................ 2003-204776

(51) Int. Cl.
*G06F 9/00* (2006.01)
(52) U.S. Cl. ..................... 713/153; 713/168; 713/189
(58) Field of Classification Search ................ 713/153, 713/168, 189
See application file for complete search history.

(56) References Cited

U.S. PATENT DOCUMENTS 5,923,339 A 7/1999 Date et al.
6,128,721 A 10/2000 Yung et al.
2007/0074269 A1 3/2007 Hua

FOREIGN PATENT DOCUMENTS

| JP | 10-188471 | 7/1998 |
|---|---|---|
| JP | 10-334040 | 12/1998 |
| JP | 2001-126393 | 5/2001 |
| JP | 2001-266492 | 9/2001 |
| JP | 2001-266509 | 9/2001 |
| JP | 2002-244925 | 8/2002 |
| JP | 2002-260339 | 9/2002 |

*Primary Examiner*—Thomas Peeso
(74) *Attorney, Agent, or Firm*—Robert J. Depke; Rockey, Depke & Lyons, LLC.

(57) ABSTRACT

A pipeline processing system and an information processing apparatus not malfunctioning even if there is a pipeline stage in which data is not correctly written, including a plurality of processing circuits for applying predetermined processing to a plurality of data blocks; memories accessed by any circuit of a plurality of processing circuits, encryptor for encrypting the data based on key information set for each series of pipeline processings continuously processed when storing processing results of the circuits in the memories; and decoders for decoding data based on set information used for the encrypting when reading the data encrypted and stored in the memories.

22 Claims, 38 Drawing Sheets

(ENCMODE & (EFMM_RDEND | 1$_{ST}$ECCEND)) | (!ENCMODE & EFMO_WREND)

(ENCMODE & EFMM_RDEND) | (ENCMODE & EFMO_WREND)

"MEM STATE"

"ECCPHASE"

PIPELINE PROCESSING SYSTEM AND INFORMATION PROCESSING APPARATUS

BACKGROUND OF THE INVENTION

1. Field of the Invention

The present invention relates to a system for pipeline processing for executing a plurality of series of processings in parallel and an information processing apparatus to which this is applied, more particularly relates to a pipeline processing system of an information processing circuit employed in an optical disc device or other information recording/reproducing apparatus and performing decoding and encoding of recording information using a memory (decoder/encoder circuit) and an information processing apparatus using the same.

2. Description of the Related Art

A decoder/encoder circuit employed in a DVD or other optical disc device performs decoder pipeline processing and encoder pipeline processing using a single buffer memory.

Below, the decoder pipeline processing and the encoder pipeline processing in a decoder/encoder circuit employed in a DVD optical disc device will be explained in relation to the drawings.

First, the decoder pipeline processing will be explained in relation to FIG. 1 and FIG. 2. FIG. 1 is a block diagram of an example of the configuration of a general decoder circuit; and FIG. 2 is view of a state of access of decoder pipeline processing to a memory buffer in the circuit of FIG. 1. In these figures, WR indicates a write operation, and RD indicates a read operation. This decoder circuit 10 has an eight-to-fourteen modulation (EFM)+demodulation circuit 11, an error correction code (ECC) circuit 12, an error detection code (EDC) circuit 13, a host interface circuit (HOST I/F) 14, a tracking buffer 15 comprised of a dynamic random access memory (DRAM) etc., and a bus 16.

A data sequences signal (RF signal) read out from an optical disc through an optical pick-up and obtained as a result of predetermined computation at an RF amplifier is subjected to binary clock extraction and supplied as a digital binary data (RF data) to the EFM+demodulation circuit 11. In the EFM+demodulation circuit 11, an RF data (BLK1) is subjected to EFM+demodulation and written into the tracking buffer 15 (EFM-WR). Next, the data stored in the tracking buffer 15 is subjected to error correction processing in the ECC circuit 12, then subjected to EDC check processing and descrambling at the EDC circuit 13. The error correction processing is processing for reading out data having error from the memory, calculating correct data from the detected error and the read out data, and writing correct data into the memory. The memory access of the error correction processing is accompanied by a read operation of an inner-code parity (PI) code (PI-RD), error correction processing in accordance with the error correction result of the PI code, a read operation of an outer-code parity (PO) code (PO-RD), and error correction processing in accordance with the error correction result of the PO code. According to need, the PI correction and the PO correction are repeated. Further, the EDC data read processing and the EDC data write processing are carried out for the same tracking buffer 15. In the EDC data read processing, in actuality, the read operation of the data before the EDC check and the read operation of the data before the descramble are simultaneously carried out. Further, the EDC data write processing actually becomes the write processing of the data after the descramble. Further, according to the transfer request from a host apparatus, the data after the EDC data write processing is transferred via the host interface circuit 14 to the host apparatus. The above processings are performed by pipeline processing of the data blocks BLK1, BLK2, and BLK3 in parallel in the format shown in FIG. 2.

Next, the encoder pipeline processing will be explained in relation to FIG. 3 and FIG. 4. FIG. 3 is a block diagram of an example of the configuration of a general encoder circuit; and FIG. 4 is a view of the state of access of the encoder pipeline processing with respect to the memory buffer in the circuit of FIG. 3. In these figures, WR indicates a write operation, and RD indicates a read operation. This encoder circuit 20 has an EFM+modulation circuit 21, an ECC circuit 22, an EDC circuit 23, a host interface circuit (HOST I/F) 24, a tracking buffer (TRCBF) 25 comprised of a DRAM etc., and a bus 26.

When user data transferred from the host controller is input to the host interface circuit 24, it is written into the tracking buffer 25 (HOST-WR). When the write operation of the user data is ended, the encoding starts. The user data is read out (EDC-RD) from the tracking buffer 25 by the EDC circuit 23, the scrambling, the EDC parity generation, the ID generation, various types of field information generation, etc. are carried out, and the scrambled user data, EDC parity, ID, and various types of field information are written into the tracking buffer 25 (EDC-WR). The ECC parity is added to the data stored in the tracking buffer 25 at the ECC circuit 22. The memory access of this encoding is accompanied by a read operation of the PI code (PI-RD), the parity portion rewrite processing of the PI code, the read operation of the PO code (PO-RD), and the parity portion rewrite processing of the PO code. Then, in the EFM+modulation circuit 21, the read operation with respect to the data stored in the tracking buffer 25 (EFM-RD), and the EFM+modulation with respect to the read out data are carried out. The data subjected to the EFM+modulation is output as a binary signal, and the processing for writing data into the disc is carried out. The above processings are performed by pipeline processing of the data blocks BLK1, BLK2, and BLK3 in parallel in the format shown in FIG. 4.

Summarizing the problem to be solved by the invention, in the above system, when there was a pipeline stage in which the data was not correctly written, the other pipeline stages treated the information in the memory as being correct, so a malfunction sometimes occurred. Particularly, when one series of pipeline processing is repeatedly carried out, if the data is not correctly written, the data stored in the portion not written in will become data written in another series of pipeline processing. At this time, if the data seemingly has a correct structure, even if there is a check function of data, the check function sometimes did not correctly act.

In an optical disc device, conventionally, if there was data which was not buffered due to a disturbance of the phase locked loop (PLL) or a disturbance of sync protection at the time of an EFM-WR, that portion's worth of data becomes data stored the previous time or before. If this data was data corrected for error (OK), at the time of error correction of the inner code, it is determined as corrected for error. That is, error will never be unable to be corrected. For this reason, a disappearance correction flag cannot be established at the time of outer code correction, so sometimes the error correction capability ends up declining. Further, generally, sometimes transfer for a transfer request of the host apparatus is performed by inspecting the EDC check state without inspecting the error correction state. In such a case, if there is the above buffering loss, that portion of the data becames data stored the previous time or before and is undesired data designated as good by the EDC check (OK), therefore sometimes is erroneously transferred to the host apparatus.

SUMMARY OF THE INVENTION

An object of the present invention is to provide a pipeline processing system free from malfunctioning even if there is a pipeline stage for which the data is not correctly written, free from decline of the error correction capability even if there is data which is not buffered, and able to prevent erroneous data transfer without incorrect checks and an information processing apparatus to which this is applied.

To attain the above object, according to a first aspect of the present invention, there is provided a pipeline processing system applying pipeline processing for a plurality of data, comprising a plurality of processing circuits configuring pipeline stages and applying predetermined processings to the plurality of data; a memory portion including at least one memory able to store data having a magnitude required in at least one pipeline stage and accessed by any processing circuit of the plurality of processing circuits; and an encrypting circuit for encrypting data based on information set for each series of pipeline processing to be continuously processed when the processing results of the processing circuits are stored in the memories of the memory portion.

According to a second aspect of the present invention, there is provided an information processing apparatus for reading recorded data from a medium recording data of a predetermined format, comprising a demodulation circuit for configuring a pipeline stage and demodulating the read data; an error processing circuit configuring a pipeline stage and performing predetermined error processing with respect to the data after the demodulation; a memory portion including at least one memory able to store data having a magnitude required in at least one pipeline stage and accessed by any circuit of the demodulation circuit or the error processing circuit; and an encrypting circuit for encrypting data based on information set for each series of pipeline processing to be continuously processed when the processing results of the demodulation circuit and error processing circuit are stored in the memories of the memory portion.

According to a third aspect of the present invention, there is provided an information processing apparatus for recording input data as the data of a predetermined format into the media, comprising: a recording data preparation circuit for preparing the data to be recorded based on the each input data; a modulation circuit configuring a pipeline stage, modulating the prepared recording data, and outputting the same as the recording data to the medium; a memory portion including at least one memory able to store the data having a magnitude required in at least each pipeline stage and accessed by any circuit of the modulation circuit or recording data preparation circuit; and an encrypting circuit for encrypting the data based on the information set for each of a series of pipeline processings continuously processed when the processing results of the recording data preparation circuit are stored in the memories of the memory portion.

According to a fourth aspect of the present invention, there is provided an information processing apparatus for reading recording data from a medium recording data of a predetermined format and recording input data as data of a predetermined format into the the medium, comprising a demodulation circuit configuring a pipeline stage and demodulating each read data; an error processing circuit configuring a pipeline stage and performing predetermined error processing with respect to the data after demodulation; a recording data preparation circuit configuring a pipeline stage and preparing data to be recorded based on each input data; a modulation circuit configuring a pipeline stage, modulating the prepared recording data, and outputting the same as the recording data to the medium; a memory portion including at least one memory able to store data having a magnitude required in at least each pipeline stage and accessed by any circuit of the demodulation circuit, error processing circuit, recording data preparation circuit, and modulation circuit; and an encrypting circuit for encrypting data based on information set for each series of pipeline processings continuously processed when the processing results of the demodulation circuit, error processing circuit, and recording data preparation circuit are stored in the memories of the memory portion.

Preferably, provision is made of a decoding circuit for decoding data based on set information used for the encrypting when reading out the data encrypted and stored in the memories to the modulation circuit or recording data preparation circuit.

According to the present invention, for example the memory portion includes one or more (for example two) first memories and second memories able to store data having a magnitude required at each pipeline stage as the memory. At the time of reproducing data and at the time of recording data, the following processings are carried out.

At the time of reproducing data, a data path of the bus portion is formed in accordance with the status information transitioning according to the processing situation of the processing circuit. Then, for example the data after the demodulation at the demodulation circuit serving as a processing circuit is encrypted based on the information set for each series of pipeline processings continuously processed by the encrypting circuit, then alternately written into the first memory and the second memory. Further, the recording data from the first memory or the second memory not written in is decoded based on the set information used for the encrypting at the decoding circuit, read out to the error circuit as the other processing circuit through the data path of the bus portion formed in accordance with the status information, and for example the data to be subjected to the error correction is encrypted based on the information set for each series of pipeline processings continuously processed by the encrypting circuit, then written into the first memory or the second memory. Then, the data after the error correction is stored in a third memory different from the first and second memories. Then, the third memory for storing the data after the end of the pipeline processing outputs the stored data according to a request of the system.

Further, at the time of recording data, the user data transferred from the host apparatus is written as the data before the pipeline processing into the third memory. Then, the user data stored in the third memory is read out by the recording data preparation circuit. For example, the user data, EDC parity, ID, and various types of field information scrambled at the recording data preparation circuit are encrypted based on the information set for each series of pipeline processings continuously processed by the encrypting circuit and then alternately written into the first memory and the second memory through the data path of the bus portion formed in accordance with the status information. Then, the data stored in the first memory or the second memory is decoded based on the set information used for the encrypting at the decoding circuit and read out to the modulation circuit.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, a preferred embodiment will be explained in detail with reference to the accompanying drawings. In the embodiment, as the information processing apparatus, the explanation will be given taking as an example an optical disc recording/reproducing apparatus, specifically a DVD recording/reproduction system.

Figure 5:
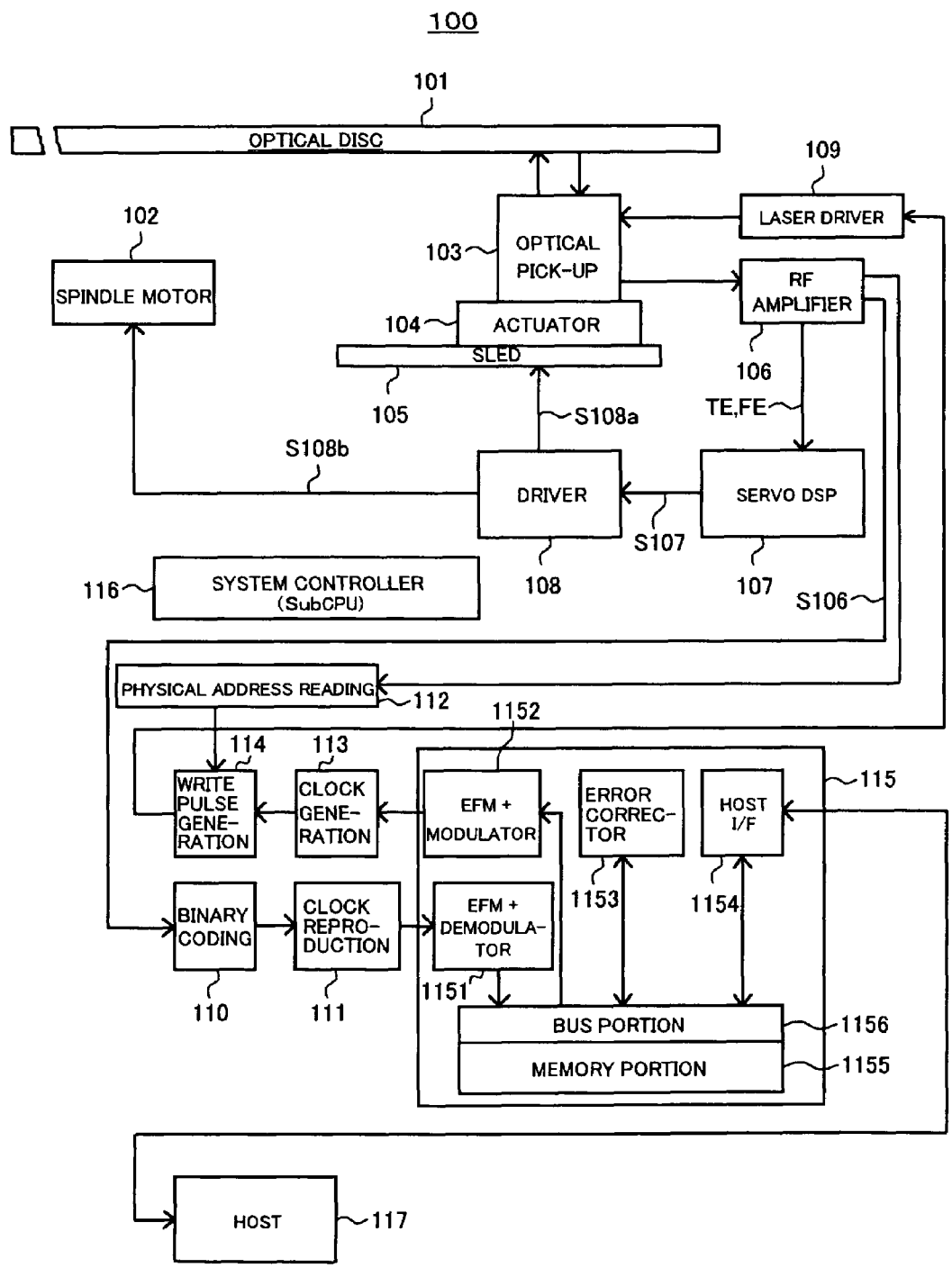
FIG. 5 is a block diagram of an embodiment of a DVD optical disc recording/reproducing apparatus employing a pipeline processing system according to the present invention.

FIG. 5 is a block diagram of an embodiment of an optical disc recording/reproducing apparatus serving as an information processing apparatus employing the pipeline processing system according to the present invention.

The optical disc recording/reproducing apparatus 100 has, as shown in FIG. 5, an optical disc (hereinafter, simply referred to as a disc) 101, a spindle motor 102, an optical pick-up 103, an actuator 104, a sled mechanism 105, an RF amplifier 106, a servo digital signal processor (servo DSP) 107, a driver circuit 108, a laser driver 109, a binary coding circuit 110, a clock reproduction circuit 111, a physical address reading circuit 112, a clock generation circuit 113, a write pulse generation circuit 114, a decoder/encoder circuit (DEC/ENC) 115, a system controller 116, and a host apparatus 117.

This optical disc recording/reproducing apparatus 100 can decodes data read from the optical disc 101 at the decoder/encoder circuit 115 as mentioned later, then transfer it through the host interface circuit to a personal computer (PC) or other host apparatus 117. On the other hand, it can receive data from the host apparatus 117 through the host interface circuit and, as will be explained later, encode it at the decoder/encoder circuit (DEC/ENC) 115 and record it in the disc 101. Note that, in the present embodiment, as an example, a system configuration showing connection with a PC as the host apparatus is shown, but the invention can be applied to not only a PC, but any of a video player, a tuner, a game machine, a telephone set, a network apparatus, a video recorder, a car navigation system, or other apparatus so long as it handles data.

Figure 6:
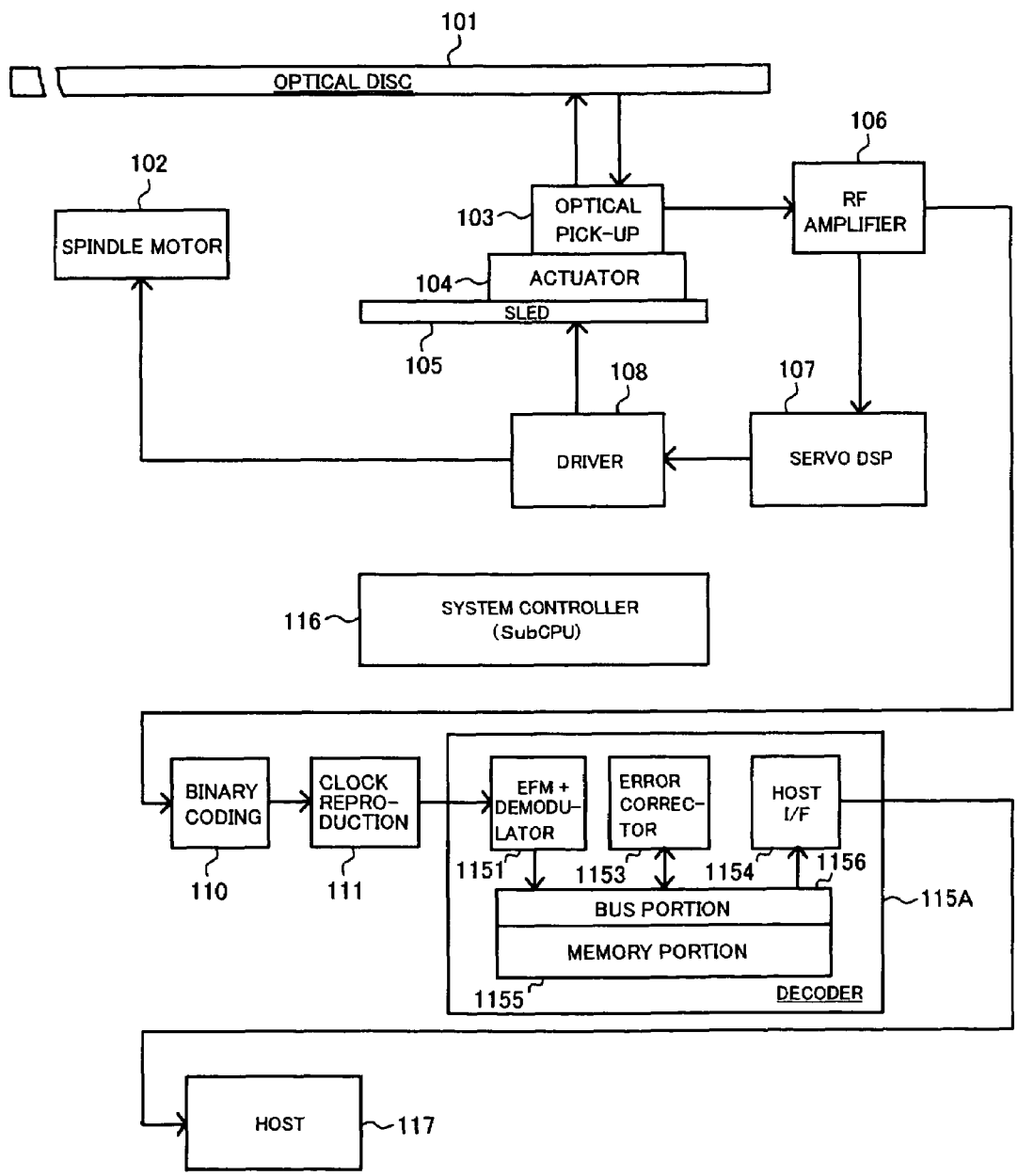
FIG. 6 is a block diagram of an embodiment of a DVD optical disc reproducing apparatus employing a pipeline processing system according to the present invention.
Figure 7:
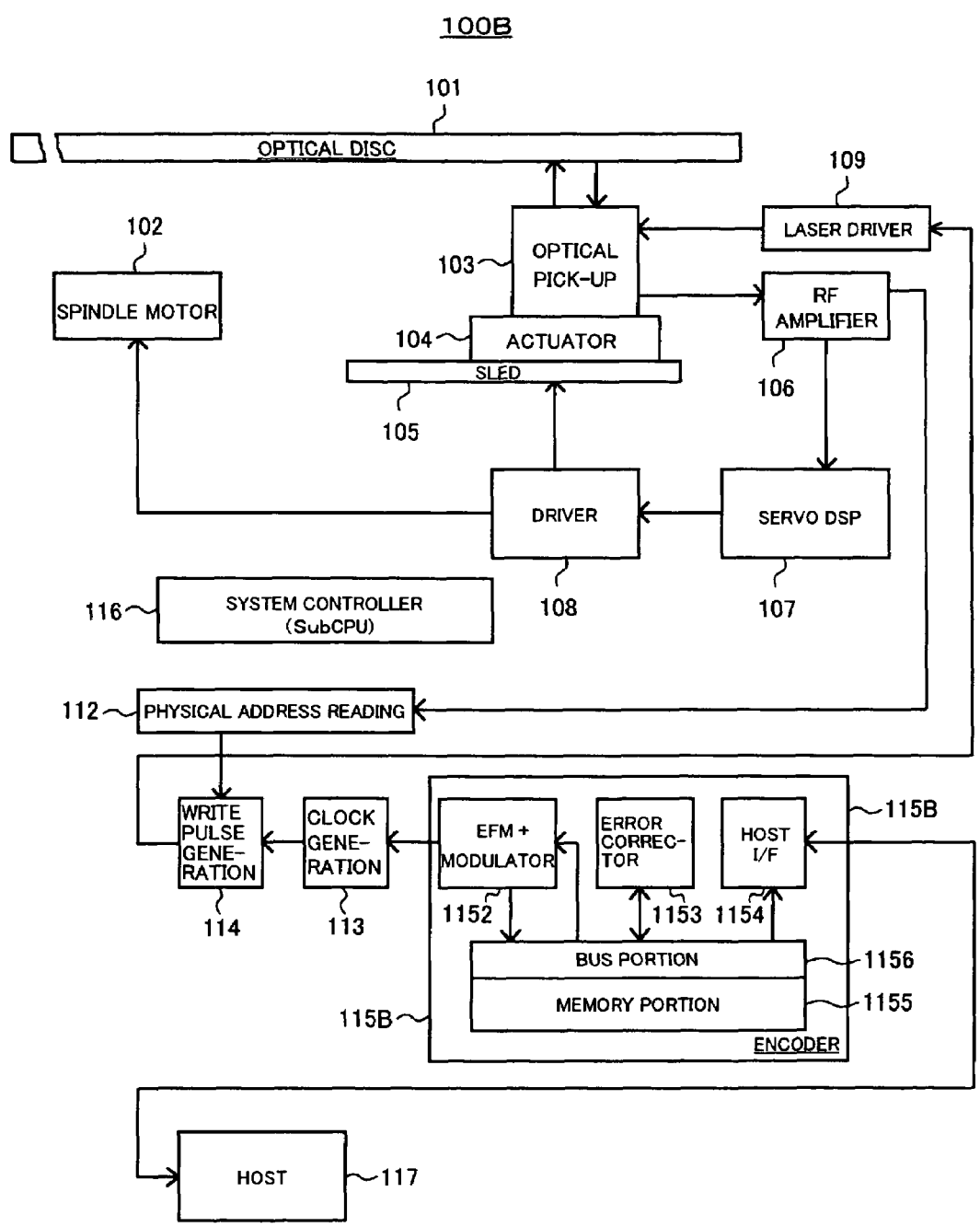
FIG. 7 is a block diagram of an embodiment of a DVD optical disc recording apparatus employing a pipeline processing system according to the present invention.

Further, it is also possible to configure a system which only reproduces data as shown in FIG. 6 or only records data as shown in FIG. 7. An optical disc reproducing apparatus 100A of FIG. 6 employs a configuration wherein for example the laser driver 109, the physical address reading circuit 112, the clock generation circuit 113, and the write pulse generation circuit 114 required for the recording system are omitted from the circuit of FIG. 5. Further, the decoder/encoder circuit 115 employs the configuration of only a decoding circuit 115A. An optical disc recording apparatus 100B of FIG. 7 employs a configuration obtained by omitting for example the binary coding circuit 110 and the clock reproduction circuit 111 required for the reproduction system from the circuit of FIG. 5. Further, the decoder/encoder circuit 115 employs the configuration of only an encoder circuit 115B.

The following explanation is only an example. Many aspects are possible in the system. The present invention is not limited to the system of the following explanation.

Below, a brief explanation will be given of parts of the optical disc recording/reproducing apparatus 100, the data format of a DVD, and the concrete configuration and function of the characterizing component of the present invention constituted by the decoder/encoder circuit (DEC/ENC) 115 in relation to the drawings.

The disc 101 is driven to rotate by the spindle motor 102. The disc 101 has a laser beam focused on it from the optical pick-up 103. The disc 101 reflects part or all of the light of the focused laser beam.

The optical pick-up 103 has a laser diode, an object lens for focusing the laser beam emitted from this laser diode to a signal recording surface of the disc 101, a polarization beam splitter for changing a direction of advance of the reflected light from the optical disc 101, a photo-detector for receiving this reflected light, etc. and is controlled in its movement in an optical axis direction of the object lens or a disc radius direction by the actuator 104 and the sled mechanism 105 driven by a drive signal S108a of the driver circuit 108. The optical pick-up 103 converts the reflected light to an electric signal at the photo-detector and outputs the signal to the RF amplifier 106. At this time, the amount of the light incident upon the optical pick-up 103 differs due to the structure and physical properties of the disc 101, therefore a signal reflecting the structure and the physical properties of the disc is transferred to the RF amplifier 106.

The actuator 104 is controlled in drive by the drive signal S108a of the driver circuit 108 and includes a tracking actuator for moving a laser beam spot in the disc radius direction with respect to the recording track of the disc 101 and a focus actuator for moving the object lens of the optical pick-up 103 in the optical axis direction. The sled mechanism 105 moves the optical pick-up 103 and the actuator 104 in the disc radius direction using the sled feed motor controlled in drive by the drive signal S108a of the driver circuit 108 as the drive source.

The RF amplifier 106 performs computations on the plurality of signals transferred from the optical pick-up 103, generates the tracking error signal TE and the focus error signal FE and outputs them to the servo DSP 107, shapes the waveform of the data sequences signal (RF signal), and outputs the result as a signal S106 to the binary coding circuit 110. Further, the RF amplifier 106 outputs the signal for reading the physical address based on the reflected light of the disc 101 to the physical address reading circuit 112 at the time of recording data on the disc 101.

The servo DSP 107 uses the tracking error signal TE and the focus error signal FE generated at the RF amplifier 106 for the focus servo, tracking servo, and sled servo control. The servo DSP 107 performs filter processing on the tracking error signal TE and the focus error signal FE by the digital filter and outputs a control signal S107 to the driver circuit 108.

The driver circuit 108 generates a drive signal S108a in accordance with a control signal S107 from the servo DSP 107, supplies a current or voltage to the actuator 104 of the optical pick-up 103, moves the optical pick-up in the focus direction or the track direction, and moves the sled 105. By this, the beam spot is controlled to the reading position on the disc 101.

Further, the amount of rotation of the spindle motor 102 is controlled to become constant by monitoring the frequency and the phase of the extracted clocks. Alternatively, it is controlled to become constant by for example the control signal S108b of the driver circuit 108 by monitoring the frequency and the phase of the rotation position information output from the spindle motor 102.

The laser driver circuit 109 drives the laser diode of the optical pick-up 103 so as to record the desired data in accordance with a write pulse generated at the write pulse generation circuit 114 at the time of recording data on for example the disc 101.

The binary coding circuit 110 digitizes the RF signal S106 from the RF amplifier 106 and outputs the result to the clock reproduction circuit 111. The clock reproduction circuit 111 includes a PLL circuit, extracts a clock based on the RF signal binary-coded at the binary coding circuit 110, and outputs the RF signal as the digital signal to the decoder/encoder circuit 115. In this way, after the RF signal is binary-coded, the clock is extracted. The signal after the end of the binary coding and the clock extraction becomes a digital signal which is supplied to the decoder/encoder circuit 115 and subjected to the EFM+demodulation. In this case, the decoder/encoder circuit 115 for performing the pipeline processing is supplied with a series of data having a magnitude required at each pipeline stage in units of blocks (BLK). For example, a plurality of blocks (for example BLK1 to BLK3) are continuously supplied.

The physical address reading circuit 112 supplies a physical address to be recorded at in accordance with the signal supplied from the RF amplifier 106 to the write pulse generation circuit 114 at the time of recording data. The clock generation circuit 113 extracts a clock based on the data encoded at the decoder/encoder circuit 115 and subjected to the EFM+modulation at the time of recording data and outputs it to the write pulse generation circuit 114. The write pulse generation circuit 114 generates a desired write pulse based on the clock from the clock generation circuit 113 and the physical address from the physical address reading circuit 112 and outputs it to the laser driver 109. The laser driver circuit 109 drives the laser diode of the optical pick-up 103 in accordance with this write pulse and records the desired data at the desired position of the desired track of the disc 101.

The decoder/encoder circuit 115 is continuously supplied with one or more of a series of continuous block units of data (hereinafter referred to as "block data") and performs the decoder pipeline processing and the encoder pipeline processing using a plurality of memories able to switch connections and the tracking buffer. In the case of decoding, the decoder/encoder circuit 115 accesses a plurality of memories (for example two memories, that is, the first and second memories) in parallel in accordance with the status information ST0 or ST1, performs the decoding, stores the data after the processing in the tracking memory, then transfers the data stored in the tracking memory to the host apparatus 117 according to a request from the host apparatus 117. In the case of encoding, the decoder/encoder circuit 115 writes the user data transferred in units of blocks from the host apparatus 117 into the third memory serving as the tracking buffer, starts the encoding, accesses a plurality of memories in parallel in accordance with the status information ST0 or ST1 to perform the encoding, and outputs the result to the clock generation circuit 113.

The decoder/encoder circuit 115 basically has, as shown in FIG. 5 to FIG. 7, an EFM+demodulator 1151, an EFM+modulator 1152, an error corrector 1153 having a parity generation function serving as the error processing circuit and the recording data preparation circuit, a host interface circuit 1154, a memory portion 1155, and a bus portion 1156 as principal components.

The EFM+demodulator 1151 performs the EFM+demodulation with respect to the digital RF signal supplied as a series of data blocks by the clock reproduction circuit 111 at the time of reproducing data and writes the data after the demodulation via the bus portion 1156 into either of the plurality of memories (two memories of the first memory and the second memory as will be explained in the present embodiment) of the memory portion 1155 in accordance with the status information ST0 or ST1.

The EFM+modulator 1152 reads out the user data (prepared data to be recorded) given the ECC parity etc. and stored in either of the plurality of memories of the memory portion 1155 in accordance with the status information ST0 or ST1, performs the EFM+modulation with respect to the read out data, and outputs the result as the binary signal to the clock generation circuit 113.

In the present embodiment, at the time of the decoding, as the status information ST0 and ST1, use is made of information transitioning according to the processing situation of at least one circuit between the EFM+demodulator 1151 and the error processing circuit. Specifically, when the EFM+demodulator 1151 writes the data after the EFM+demodulation into the first memory or the second memory, it alternately transitions to the state 0 and the state 1. When the state 0, the data becomes the status information ST0, while when the state 1, it becomes the status information ST1. At the time of the encoding, as the status information ST0 and ST1, use is made of information transitioning according to the processing situation of at least one circuit between the EFM+modulator 1152 and the error corrector 1153 as the recording data preparation circuit. Specifically, it alternately transitions to the state 0 and the state 1 when the EFM+modulator 1152 reads the data to be recorded for the EFM+modulation from the first memory or the second memory. When the state 0, it becomes the status information ST0, while when the state 1, it becomes the status information ST1.

Note that the status information is not limited to information according to the processing situation of the circuit. It is also possible to configure the system so that the status information ST0 and ST1 are alternately output every predetermined time by for example a timer. Various aspects are possible. Further, two status information were used because the two memories of the first memory and the second memory were covered in this embodiment, but the number of status information may be appropriately changed in accordance with the number of the memories.

The error corrector 1153 includes the ECC circuit and the EDC circuit. At the time of reproducing data, it reads out the data after the EFM+demodulation written in either of the plurality of memories of the memory portion 1155 via the bus portion 1156 in accordance with the status information ST0 and ST1, performs error correction processing such as the EEC processing and the EDC processing while accessing the plurality of memories of the memory portion 1155 in accordance with the status information ST0 and ST1, and stores the data for which the error correction has ended via the bus portion 1156 into the tracking memory of the memory portion 1155. Further, at the time of recording data, the error corrector 1153 reads out the user data from the tracking memory of the memory portion 1155 via the bus portion 1156, performs the scrambling, the EDC parity generation, the ID generation, various types of field information generation, etc., and alternately writes the scrambled user data, EDC parity, ID, and various types of field information into the plurality of memories of the memory portion 1155 in accordance with the status information ST0 and ST1 for every block unit.

At the time of reproducing data, the host interface circuit 1154 transfers the data after the decoding stored in the tracking memory of the memory portion 1155 to the host apparatus 117 according to a request from the host apparatus 117. At the time of recording data, the host interface circuit 1154 writes the user data to be encoded transferred from the host controller 117 in units of blocks into the tracking buffer of the memory portion 1155 via the bus portion 1156.

The memory portion 1155 includes a plurality of memories (two in the present embodiment, i.e., the first memory and the second memory) made of for example SRAMs able to store data having a magnitude required at each pipeline stage as the memory and a memory serving as a buffer memory (third memory) made of for example a DRAM and performs the following processing at the time of reproducing data and the time of recording data.

At the time of reproducing data, the memory portion 1155 alternately writes data in units of blocks after the EFM+ demodulation at the EFM+demodulator 1151 supplied through the data path of the bus portion 1156 formed in accordance with the status information ST0 and ST1 into the first memory and the second memory, reads out the recorded data from the first memory or the second memory not written into the error corrector 1153 through the data path of the bus portion 1156 formed in accordance with the status information ST0 and ST1, writes the data (EDC) for the error correction into the first memory or the second memory, and stores the data after ending the error correction into the third memory (tracking memory).

At the time of recording data, the memory portion 1155 writes the user data transferred from the host apparauts 117 in units of blocks (or in units of smaller sectors, 1 block=16 sectors) into the third memory (tracking memory) serving as the tracking buffer via the bus portion 1156, the error corrector 1153 reads out the user data stored in the third memory after the start of the encoding, the user data, the EDC parity, ID, and various types of field information scrambled at the error corrector 1153 are alternately written through the data path of the bus portion 1156 formed in accordance with the status information ST0 and ST1 into the first memory and the second memory for every block unit, and the EFM+modulator 1152 reads out the data stored in the first memory or the second memory.

The bus portion 1156 has a path switching function for switching the data transfer path between the EFM+demodulator 1151, the EFM+modulator 1152, and the error corrector 1153 with the first memory and the second memory of the memory portion 1155 in accordance with the status information ST0 and ST1, forming the data transfer path among the error corrector 1153 and the host interface circuit 1154 and the tracking buffer of the memory portion 1155, and efficiently performing the decoding pipeline processing at the time of reproducing data and the encoding pipeline processing at the time of recording data.

Below, an explanation will be given of the more concrete configurations and functions of the error corrector 1153, the memory portion 1155, and the bus portion 1156 in the decoder/encoder circuit 115.

Figure 8:
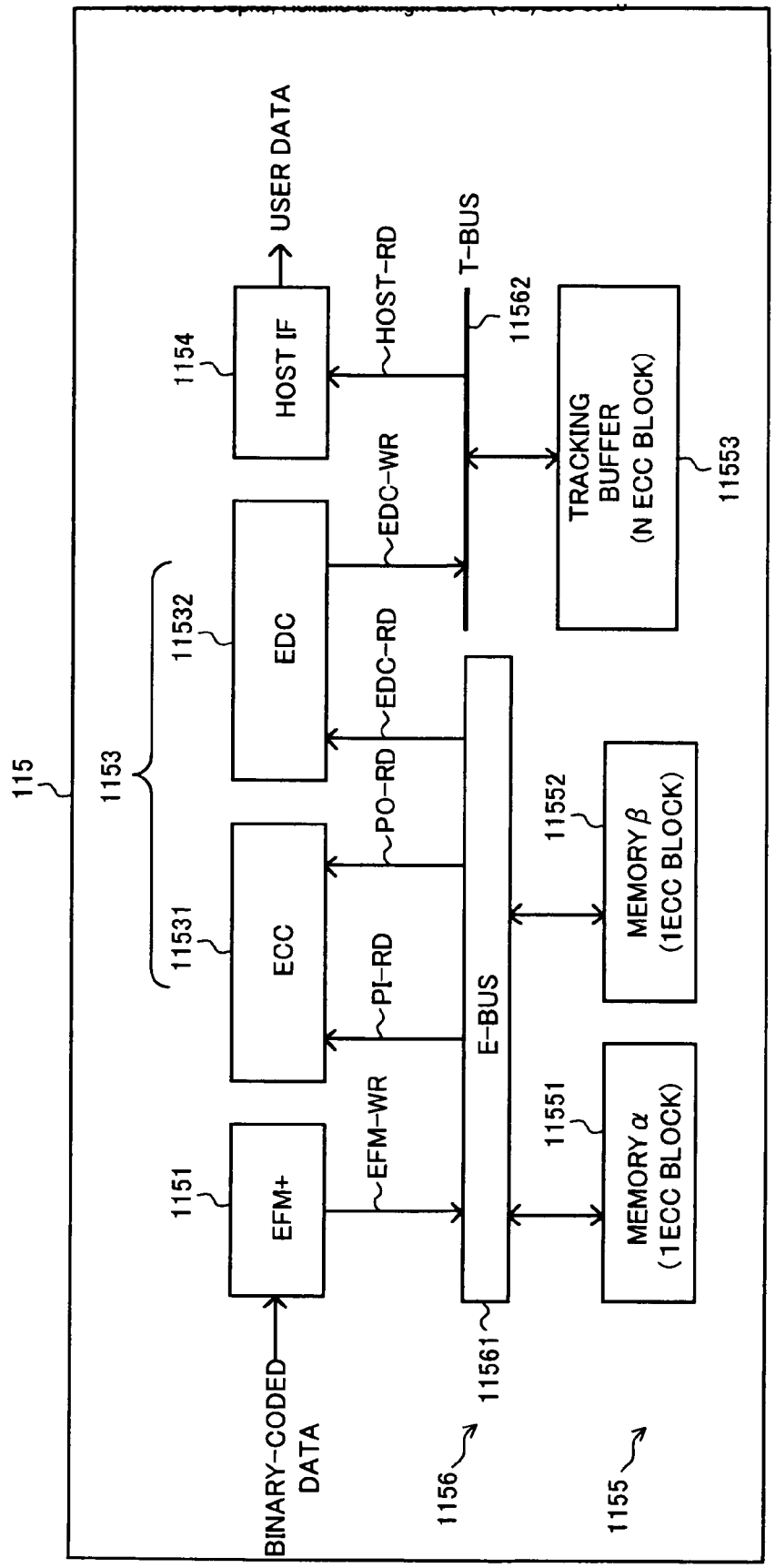
FIG. 8 is a diagram of the concrete configuration of an error corrector, a memory portion, and a bus portion in a decoder/encoder circuit according to the present embodiment in the case of decoding at the time of data reproduction and specifically showing a data path.
Figure 9:
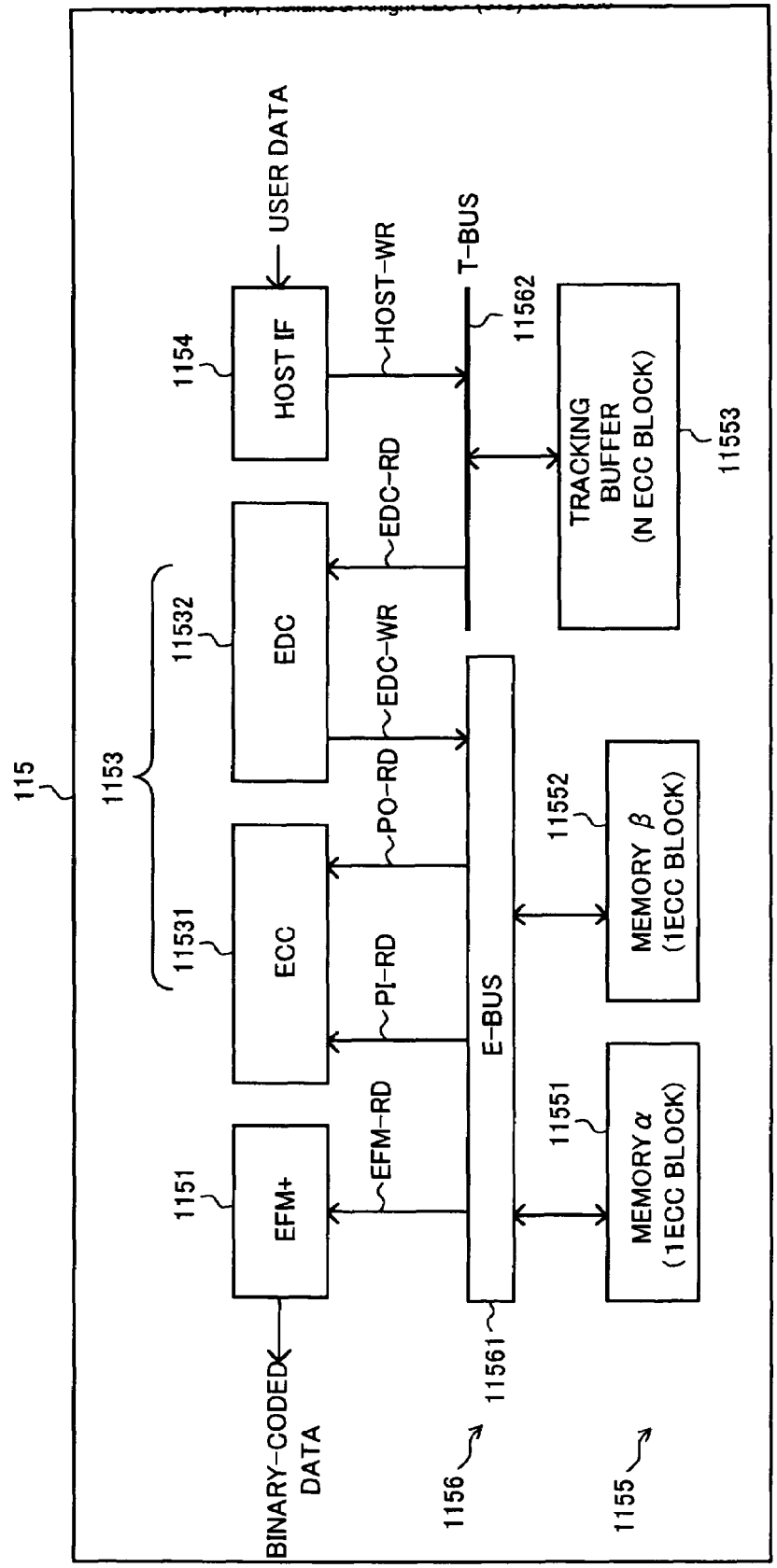
FIG. 9 is a diagram of the concrete configuration of an error corrector, a memory portion, and a bus portion in a decoder/encoder circuit according to the present embodiment in the case of encoding at the time of data recording and specifically showing a data path.

FIG. 8 is a diagram of the concrete configurations of the error corrector 1153, the memory portion 1155, and the bus portion 1156 in the decoder/encoder circuit 115 in the case of the decoding at the time of reproducing data and specifically shows the data path. Further, FIG. 9 is a diagram of the concrete configurations of the error corrector 1153, the memory portion 1155, and the bus portion 1156 in the decoder/encoder circuit 115 in the case of the encoding at the time of recording data and specifically shows the data path. In these figures, WR indicates a write operation, and RD indicates a read operation.

The error corrector 1153 of FIG. 8 and FIG. 9 includes an ECC circuit 11531 and an EDC circuit 11532. The memory portion 1155 of FIG. 8 and FIG. 9 includes a first memory 11551 (sometimes also referred to as a memory α) made of for example an SRAM, a second memory 11552 (sometimes also referred to as a memory β) made of for example an SRAM, and a third memory (tracking memory) 11553 made of a DRAM. The bus portion 1156 of FIG. 8 and FIG. 9 has an EFM+demodulator 1151, an EFM+modulator 1152, an ECC circuit 11531 of the error corrector 1153, a first bus (E-BUS) 11561 including a function of switching the data transfer path between the EDC circuit 11532 and the first memory 11551 and the second memory 11552 of the memory portion 1155 in accordance with the status information ST0 and ST1, and a second bus (T-BUS) 11562 for forming the data transfer path among the EDC circuit 11532 and the host interface circuit 1154 and the third memory (tracking memory) 11553 of the memory portion 1155.

Figure 10:
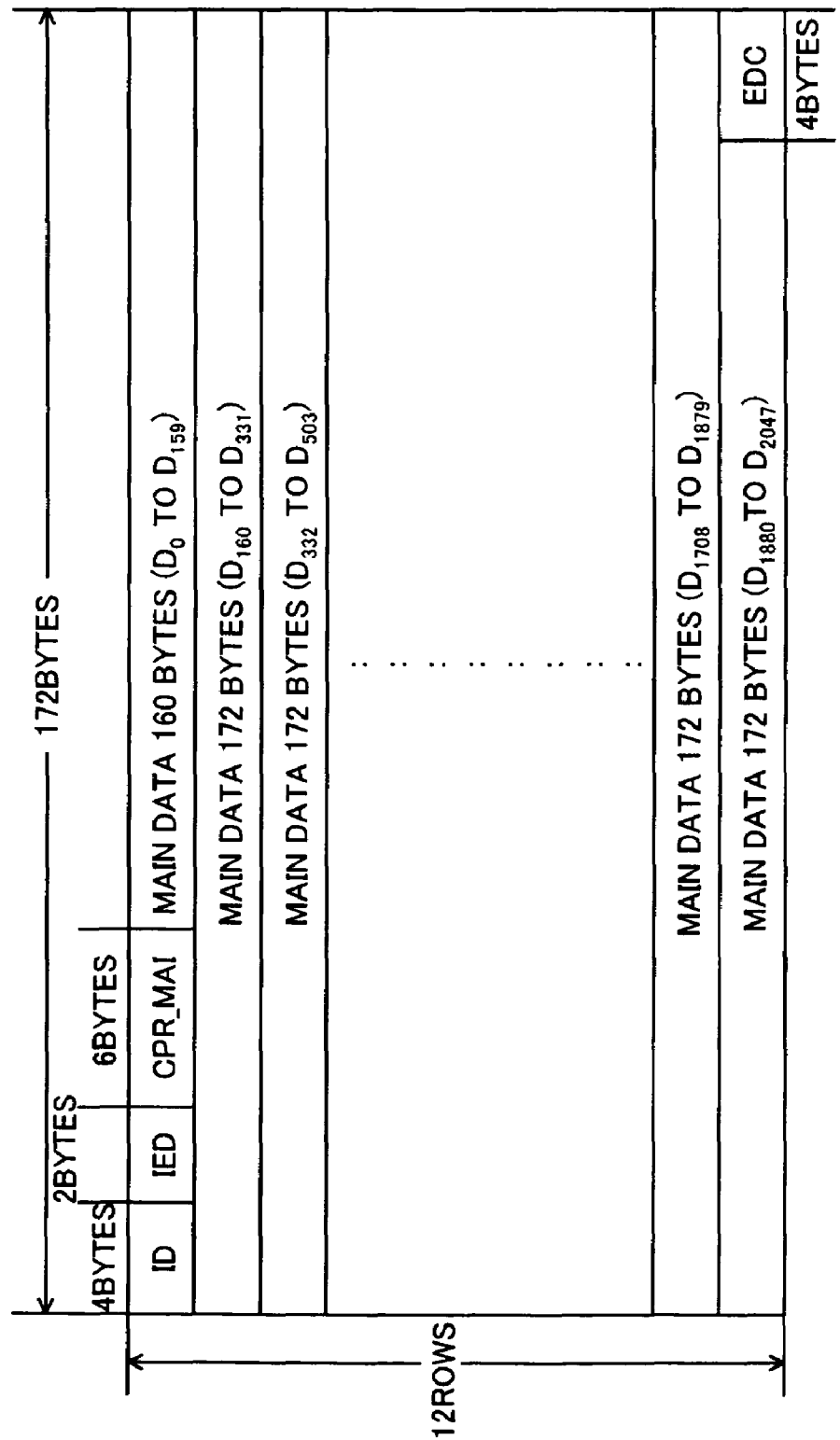
FIG. 10 is a diagram for explaining a DVD data format showing a data frame structure.
Figure 11:
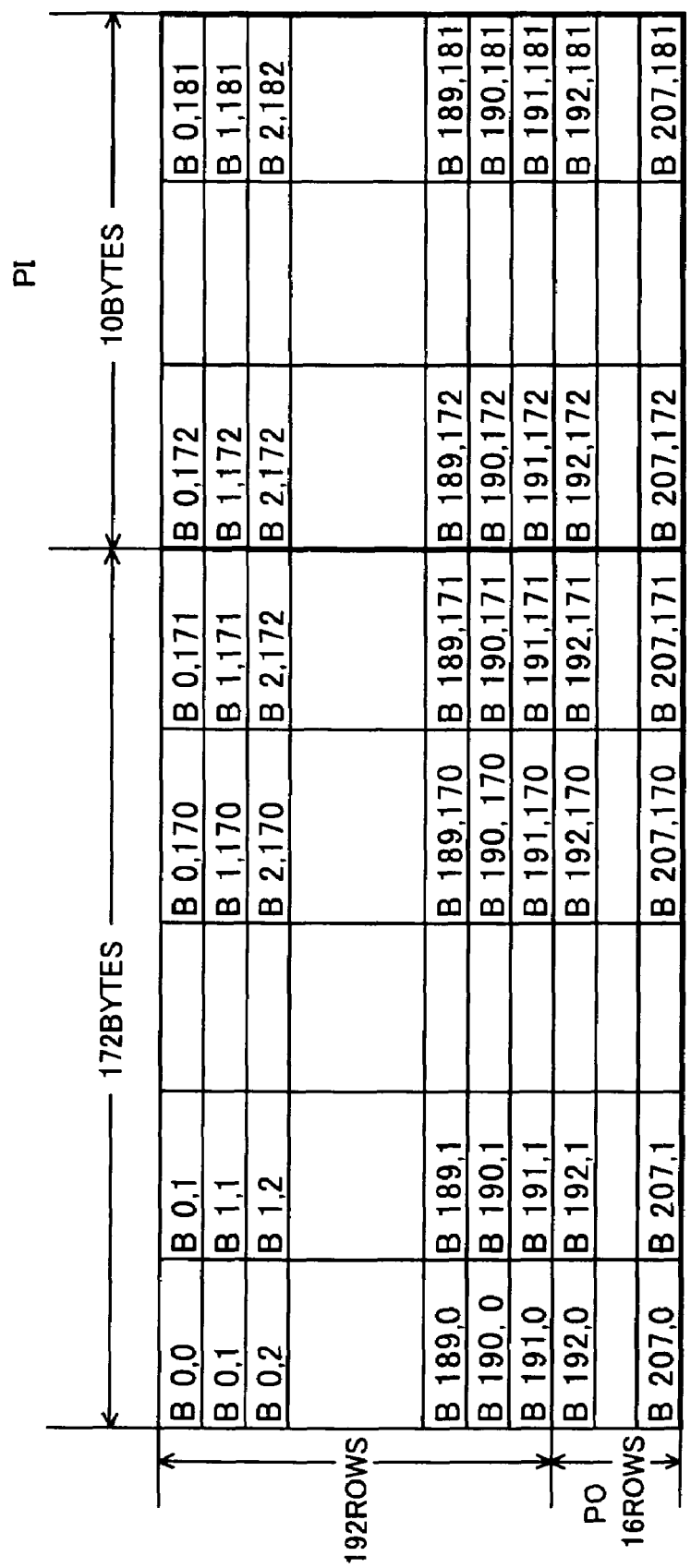
FIG. 11 is a diagram for explaining a DVD data format showing an ECC block structure.

Here, for easy understanding of the following explanation, the data format of the DVD will be summarized in relation to FIG. 10 and FIG. 11.

FIG. 10 is a diagram for explaining a DVD data format showing a data frame structure. FIG. 11 is a diagram for explaining the DVD data format showing an ECC block structure.

As shown in FIG. 10, the data frame is comprised of 2064 bytes in total of main data of 2048 bytes, an ID (Identification Data) of 4 bytes arranged on the header side of the main data, an IED (ID Error Detection Code) of 2 bytes, a CPR_MAI (Copyright Management Information) of 6 bytes, and an EDC (Error Detection Code) of 4 bytes behind the main data. In a data frame having such a structure, after the EDC computation, the main data of 2048 bytes is added. This becomes the scramble frame.

An ECC block is comprised of 16 continuously scrambled frames. Namely, as shown in FIG. 11, an ECC block is formed by 16 scrambled frames as the information field. The 172 bytes×192 rows shown in FIG. 11 are equivalent to 172 bytes×12 rows×16 scrambled frames. Each of the 172 columns is given a Reed-Solomon (RS) 16-byte outer-code parity (PO). Each of the 208 rows including the PO code is given a 10 byte inner-code parity (PI).

At the time of the decoding, the ECC circuit 11531 performs the error correction processing of the block data after the EFM+demodulation stored in the first memory 11551 and the second memory 11552 of the memory portion 1155. The memory access of the error correction processing in the ECC circuit 11531 at the time of the decoding is accompanied by the read operation of the PI code, the error correction processing in accordance with the error correction result of the PI code, the read operation of the PO code, and the error correction processing in accordance with the error correction result of the PO code. According to need, the PI correction and the PO correction are repeated. At the time of encoding, the ECC circuit 11531 performs the ECC parity addition with respect to the data stored in the first memory 11551 or the second memory 11552 after so-called EDC processing by the EDC circuit 11532.

The error correction processing is processing for reading out data having error from the memory, calculating the correct data from the detected error and read out data, and writing the correct data into the memory. The memory access of the ECC circuit 11531 at the time of encoding is accompanied by the read operation of the PI code, the parity portion rewrite processing of the PI code, the read operation of the PO code, and the parity portion rewrite processing of the PO code. Note that there are two methods for parity portion rewrite processing. The first method is the method of reading out the parity portion from the memory, calculating the correct parity, and writing the parity into a memory n. The second method is the method of directly writing the correct parity without reading out the parity portion.

Figure 12:
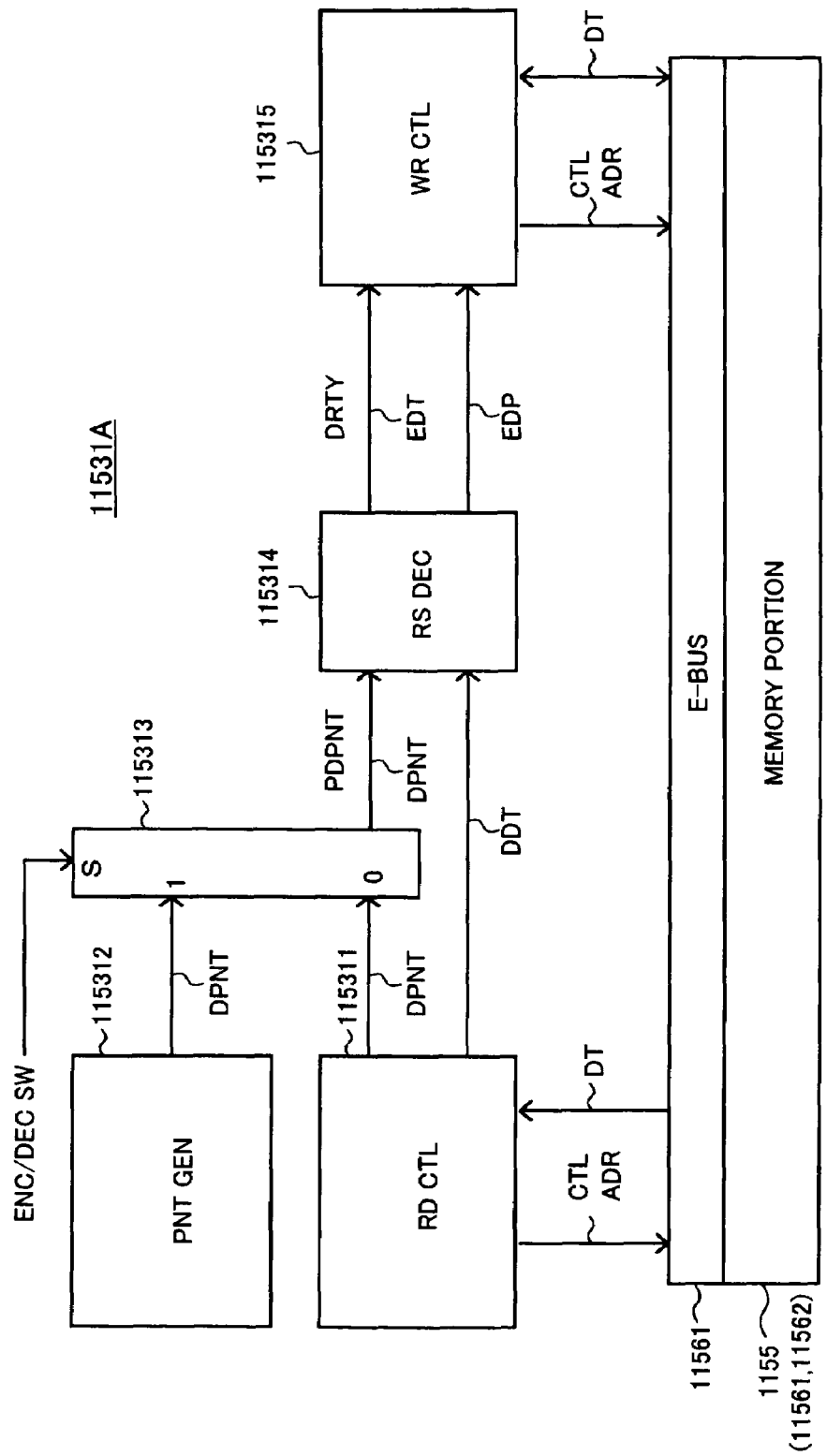
FIG. 12 is a block diagram of a first example of the configuration of principal parts of an ECC circuit according to the present embodiment.

FIG. 12 is a block diagram of a first example of the configuration of the principal parts of the ECC circuit according to the present embodiment.

This ECC circuit 11531A shares the ECC decoder (DEC) and the ECC encoder (ENC) and has, as shown in FIG. 12, a code data memory read control circuit (RDCTL) 115311, a parity extinction pointer generator (PNTGEN) 115312, a selector 115313, an RS decoder (RSDEC) 115314, and an RS decoding result memory write control circuit (WRCTL) 115315.

When the ECC circuit 11531A functions as an ECC decoder, an ENC/DEC switch signal SW is set at for example a data "0" and supplied to the selector 115313. Due to this, the selector 115313 selects the output of the code data memory read control circuit 115311 and supplies it to the RS decoder 115314. Then, at the time of error correction, the code data memory read control circuit 115311 outputs the address ADR to the memory portion 1155 and reads out the data DT. Due to this, the code data DDT and the extinction pointer DPNT are read out and output to the selector 115313. Then, the read out code data DDT and the extinction pointer DPNT are input to the RS decoder 115314. The RS decoder 115314 outputs the error position EDP of the error and the error data EDT included in the input code to the RS decoding result memory write control circuit 115315. The RS decoding result memory write control circuit 115315 outputs the address ADR of the data of the error position to the memory portion 1155, reads out the data DT, performs the error correction by the error data EDT, and then writes the result into the memory portion 1155.

When the ECC circuit 11531A functions as an ECC encoder, the ENC/DEC switch signal SW is set at for example a data "1" and supplied to the selector 115313. Due to this, the selector 115313 selects the output of the parity extinction pointer PDPNT generated at the parity extinction pointer generator (PNTGEN) 115312 and supplies the same to the RS decoder 115314. Note that the extinction pointer output by the parity extinction pointer generator 115312 becomes "1" only at the parity portion. Then, at the time of parity addition at the encoding, the code data memory read control circuit 115311 outputs the address ADR to the memory portion 1155 and reads out the data DT. Due to this, the code data DDT is read out, and the extinction pointer DPNT is output to the selector 115313. Then, the read out code data DDT and the parity extinction pointer PDPNT are input to the RS decoder 115314. The RS decoder 115314 outputs the parity PRTY to the RS decoding result memory write control circuit 115315 based on the error position EDP and the error data EDT included in the input code. The RS decoding result memory write control circuit 115315 outputs the address ADR of the data to which the parity is to be added and the parity data to be added to the memory portion 1155 and writes the result into the memory portion 1155.

Figure 13:
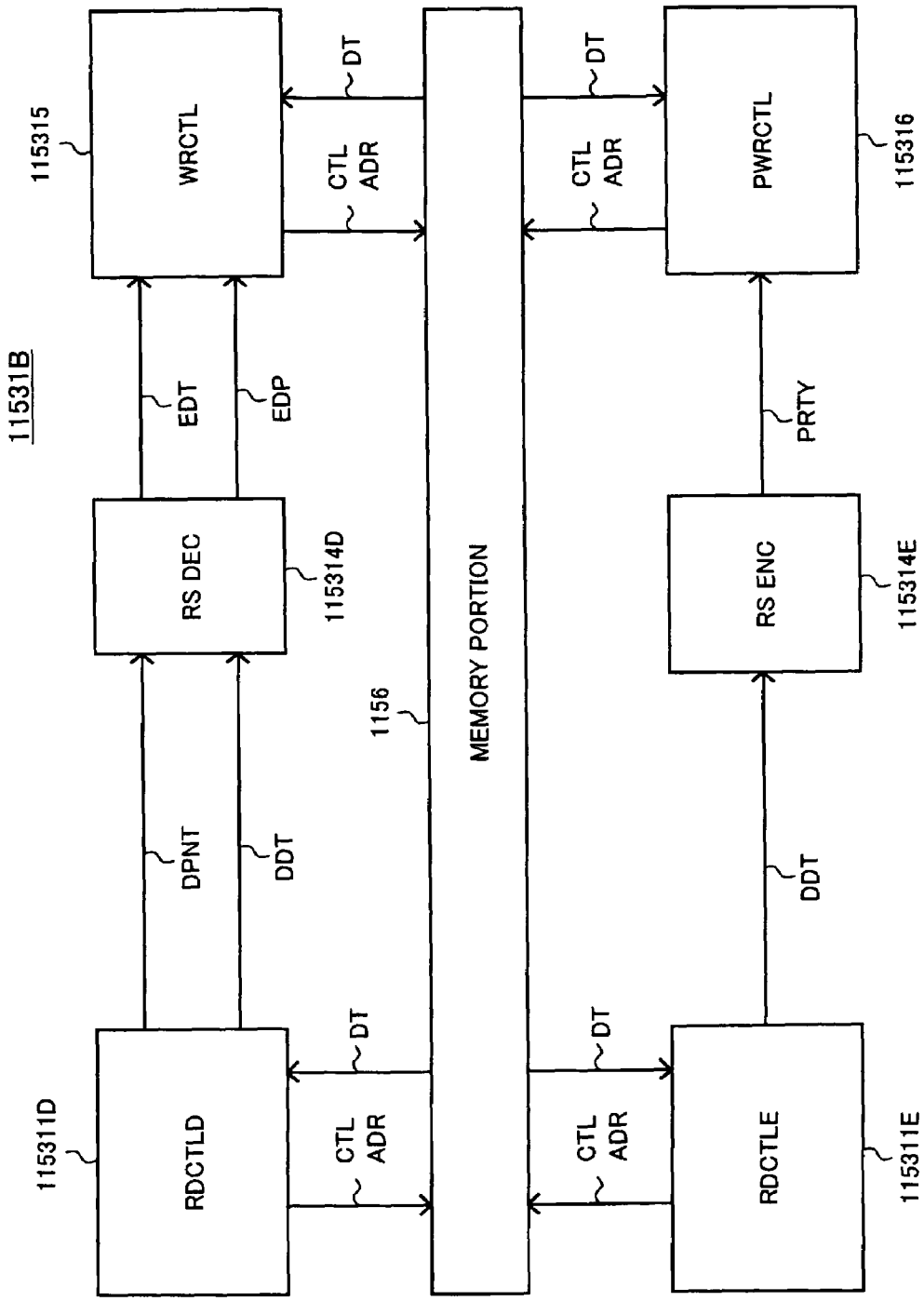
FIG. 13 is a block diagram of a second example of the configuration of principal parts of an ECC circuit according to the present embodiment.

FIG. 13 is a block diagram of a second example of the configuration of the principal parts of the ECC circuit according to the present embodiment.

This ECC circuit 11531B does not share the ECC decoder (DEC) and the ECC encoder (ENC) and is configured as a separate system. The difference from the circuit of FIG. 12 resides in the point that it is not provided with the parity extinction pointer generator (PNTGEN) 115312 and the selector 115313, but has two code data memory read control circuits (RDCTLD) 115311D for decoding and encoding, a code data memory read control circuit (RDCTLE) 115311E, an RS decoder (RSDEC) 115314D, an RS encoder (RSENC) 115314E, an RS decoding result memory write control circuit (WRCTL) 115315, and a parity write control circuit (PWRCTL) 115316.

When the ECC circuit 11531B functions as an ECC decoder, the code data memory read control circuit 115311D outputs the address ADR to the memory portion 1155 and reads out the data DT. Then, the read out code data DDT and extinction pointer DPNT are input to the RS decoder 115314D. The RS decoder 115314D outputs the error position EDP of the error included in the input code and the error data EDT to the RS decoding result memory write control circuit 115315. The RS decoding result memory write control circuit 115315 outputs the address ADR of the data of the error position to the memory portion 1155, reads out the data DT, performs the error correction by the error data EDT, then writes the same into the memory portion 1155.

When the ECC circuit 11531B functions as an ECC encoder, the code data memory read control circuit 115311E outputs the address ADR to the memory portion 1155 and reads out the data DT. Then, the read out code data DDT is input to the RS encoder 115314E. The RS encoder 115314E generates the parity PRTY based on the input code and outputs it to the parity write control circuit 115316. The parity write control circuit 115316 outputs the address ADR of the data for addition of the parity and the parity data to be added to the memory portion 1155 and writes the same into the memory portion 1155.

The ECC circuit 1153 can be configured by any of the circuits of FIG. 12 and FIG. 13. Note that the circuit of FIG. 13 is liable to become larger in the number of circuit elements and larger in size in comparison with the circuit of FIG. 12, so the circuit of FIG. 12 is more preferred from the viewpoints of the reduction of the circuit scale and lowering of the cost of the system. Namely, the circuit of FIG. 12 can form an error correction encoder by a minor change to the error correction decoder. As a result, not only can the error correction encoder/decoder itself be shared, but also the code data read control circuit and the parity write control circuit of the peripheral circuits thereof can be shared at the time of encoding/decoding, the circuit scale can be made small, and the system can be realized at a low cost.

At the time of decoding, the EDC circuit 11532 (refer to FIG. 8) performs the EDC check processing and the descrambling of the data after the error correction processing and writes the data after the descrambling into the tracking buffer (third memory) 11553 of the memory portion 1155.

Figure 14:
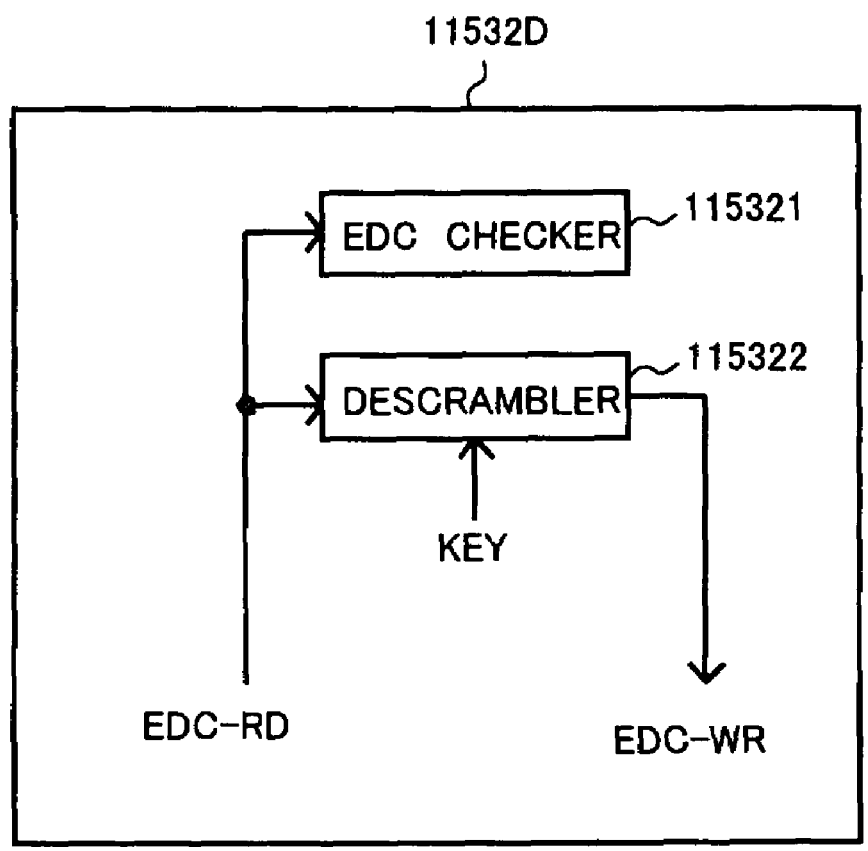
FIG. 14 is a block diagram of the configuration of principal parts of a decoding system of an EDC circuit according to the present embodiment.

FIG. 14 is a block diagram of the configuration of the principal parts of the decoding system of the EDC circuit according to the present embodiment. The decoding system 11532D has, as shown in FIG. 14, an EDC checker 115321 for performing the EDC check processing and a descrambler 115322 for performing the descrambling.

The EDC check processing by the EDC checker 115321 and the descrambling by the descrambler 115322 are simultaneously executed. This becomes possible since the data read sequences are similar between the two processings. The descrambling descrambles the data scrambled by using a certain key information (Key) by using the key information (Key) used for the scrambling. The descrambled data is not written back to the original memory, but is written into the tracking buffer (third memory) 11553 of the memory portion 1155. For this reason,. in the decoding system 11532D, the EDC data reading processing (EDC-RD) from the first memory (memory α) 11551 or the second memory (memory β) 11552 of the memory portion 1155 and the EDC data write processing (EDC-WR) into the tracking buffer 11553 are simultaneously executed. The data written into the tracking buffer 11553 is the data after ending the decoding.

At the time of the encoding, the EDC circuit 11532 reads out the user data from the tracking buffer 11553 of the memory portion 1155, performs the scrambling, the EDC parity generation, the ID generation, various types of field information generation, etc. and writes the scrambled user data, EDC parity, ID, and various types of field information into the first memory (memory α) 11551 or the second memory (memory β) 11552 of the memory portion 1155.

Figure 15:
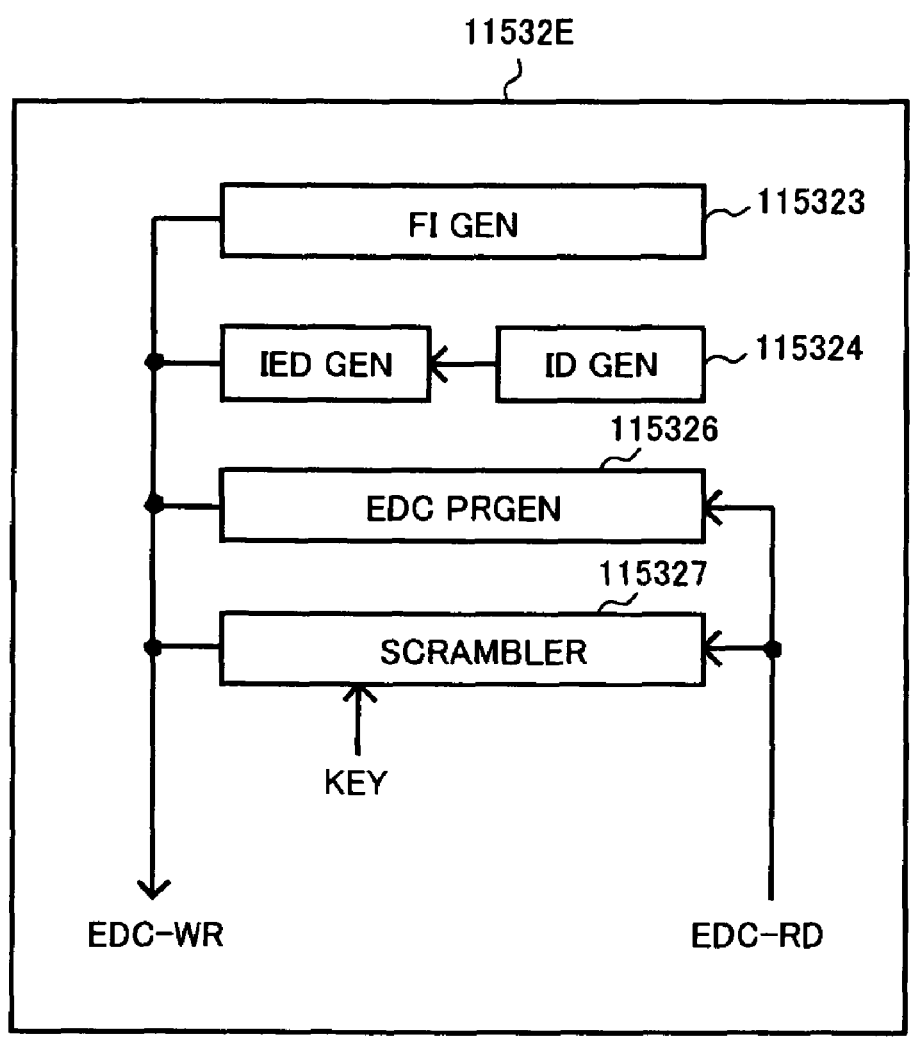
FIG. 15 is a block diagram of the configuration of principal parts of an encoding system of an EDC circuit according to the present embodiment.

FIG. 15 is a block diagram of the configuration of the principal parts of the encoding system of the EDC circuit according to the present embodiment. The encoding system 11532E has, as shown in FIG. 15, a field information generation circuit (FIGEN) 115323 for generating various types of field information, an ID generation circuit (IDGEN) 115324, an IED generation circuit (IEDGEN) 115325, an EDC parity generation circuit (EDCPRGEN) 115326, and a scrambler 115327 for performing the scrambling.

The EDC parity generation by the EDC parity generation circuit 115326 and the scrambling by the scrambler 115327 are simultaneously executed. This is possible since the data read sequences are similar between the two processings. The scrambling scrambles the data by using certain key information (Key). The scrambled data is not written back to the original memory, but is written into the first memory 11551 or the second memory 11552 of the memory portion 1155. For this reason, the EDC data read processing (EDC-RE) from the tracking buffer 11553 and the EDC data write processing (EDC-WR) into the first memory (memory α) 11551 or the second memory (memory β) 11552 of the memory portion 1155 are simultaneously executed.

The memory portion 1155 has, as mentioned above, the first memory 11551 (memory α) made of an SRAM, the second memory 11552 (memory β) made of an SRAM, and the third memory (tracking memory) 11553 made of a DRAM. Their capacities are for example set as follows. The first memory 11551 and the second memory 11552 are set at capacities able to store data having magnitudes required at each pipeline stage, specifically capacities able to store at least one ECC block's worth of data. The third memory (tracking memory) 11553 is set at a capacity N times the ECC block. Note that, the tracking buffer 11553 configures a ring buffer and functions as a buffer with respect to fluctuations in the frequency of transfer requests from the host apparatus 117. Alternatively, it becomes a certain type of cache memory along with the previous read processing.

Figure 16:
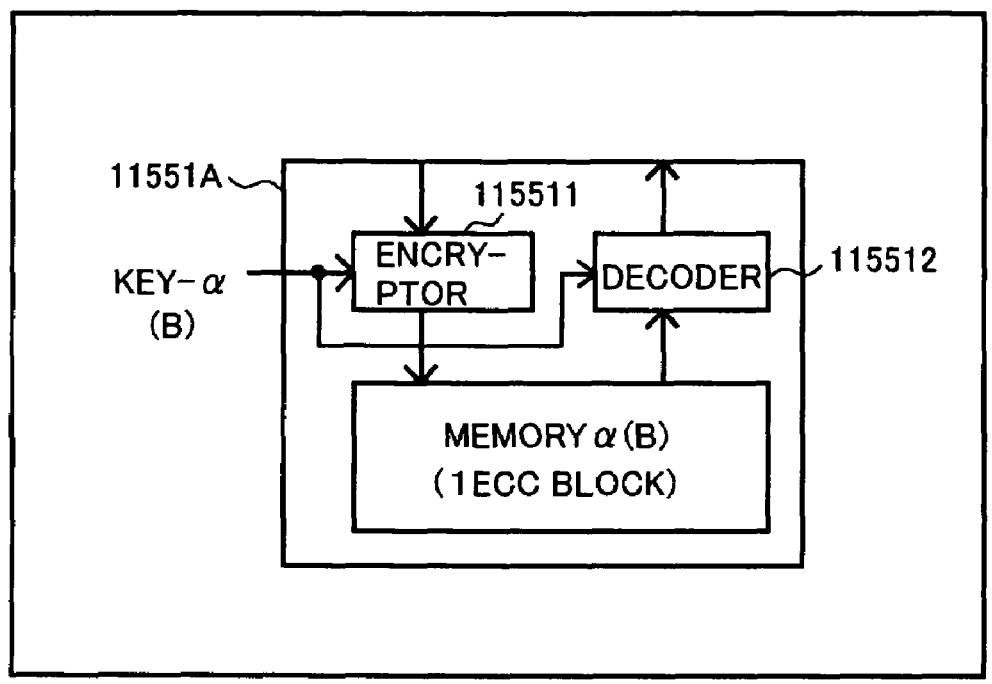
FIG. 16 is a diagram of an example of the configuration of a memory which encrypts the data by a predetermined key and stores the result when storing data in a first memory and a second memory and decodes the same by using the key at the time of the encrypting when reading data according to the present embodiment.

Further, the present embodiment is configured so that when storing data into the first memory 11551 and the second memory 11552, the data is encrypted with the predetermined key and stored the encrypted data and so that when reading the data, the data is decoded by using the key at the time of the encrypting. For this reason, for examples as shown in FIG. 16, an encryptor 115511 for encrypting the stored data with the key KEY-α and storing the same in the memory α and a decoder 115512 for decoding the data stored in the memory α with a reading key KEY-α are provided in the first memory 11551A.

Figure 17:
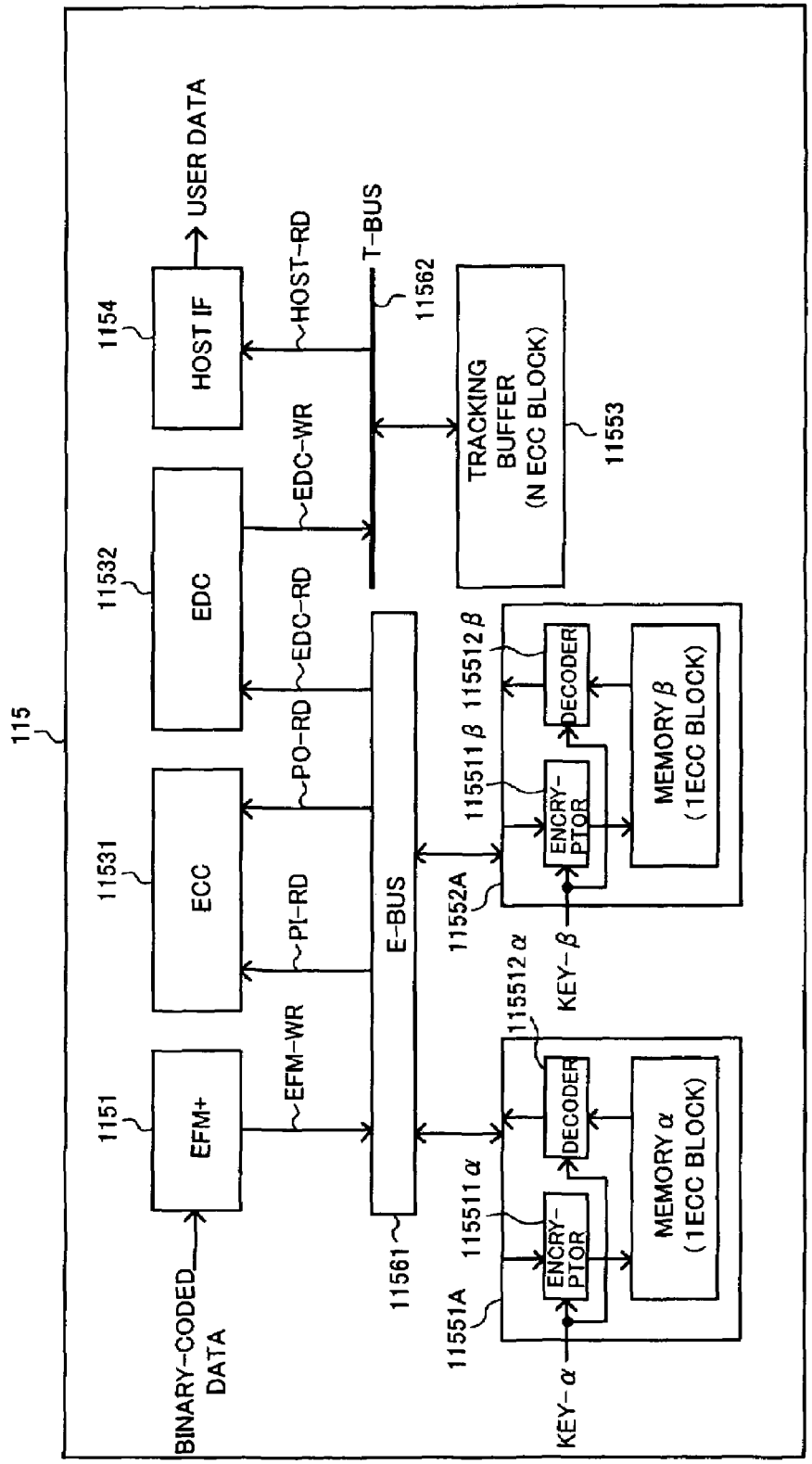
FIG. 17 is a block diagram of an example of the configuration of a decoder/encoder circuit employing a first memory and a second memory including an encryptor and a decoder according to the present embodiment.

FIG. 17 is a block diagram of an example of the configuration of the decoder/encoder circuit 115 employing the first memory 11551A and the second memory 11552A including these encryptor and decoder.

In FIG. 17, the configuration other than the configuration of the first memory 11551A and the second memory 11552A is the same as the configuration of FIG. 8. As shown in FIG. 17, the first memory 11551A is provided with an encryptor (encrypting circuit) 115511α for encrypting the storage data with the key KEY-α and storing the same in the memory α and a decoder (decoding circuit) 115512α for decoding the data stored in the memory α with the reading key KEY-α. In the same way, the second memory 11552A is provided with an encryptor (encrypting circuit) 115511β for encrypting the storage data with a key-β and storing the same in the memory β and a decoder (decoding circuit) 115512β for decoding the data stored in the memory β with the reading key KEY-β.

Note that FIG. 17 shows the state of encrypting the memory storage data at the time of the decoding. In FIG. 17, the encryptor/decoder is arranged between the first bus 11561 including the memory switch and the memory, but it is also possible to arrange the same between the first bus 11561 including the memory switch and the circuit configuring each pipeline, the EFM demodulator 1151, the ECC circuit 11531, and the EDC circuit 11532.

Figure 18:
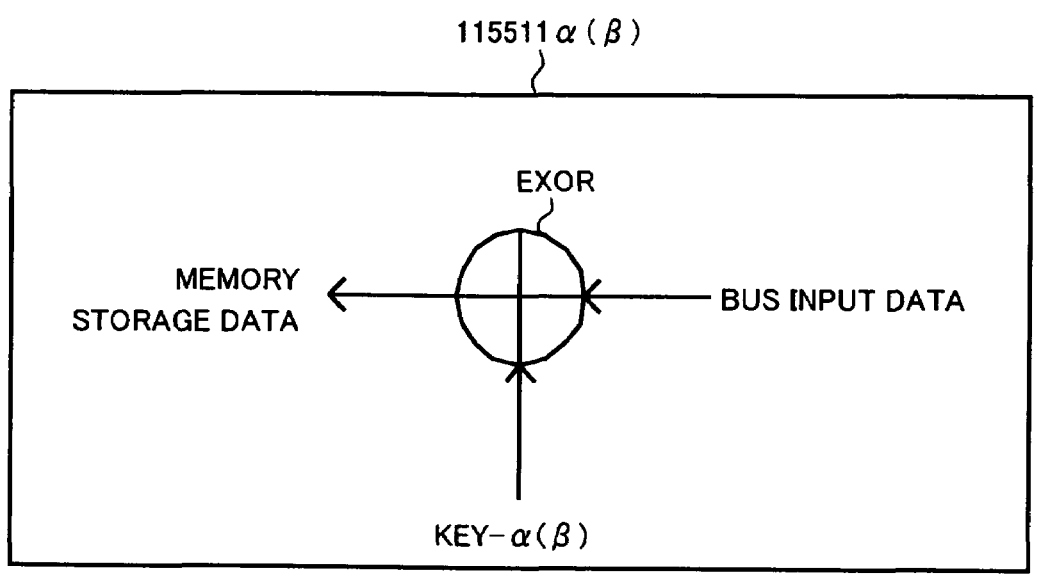
FIG. 18 is a diagram of an example of the configuration of an encryptor according to the present embodiment.

The encryptor 115511α (β) encrypts the data by taking an exclusive logical OR of the key KEY-α(β) at the exclusive logical OR gate EXOR with respect to the input data as shown in for example FIG. 18 and stores the same in the memory α (β).

Figure 19:
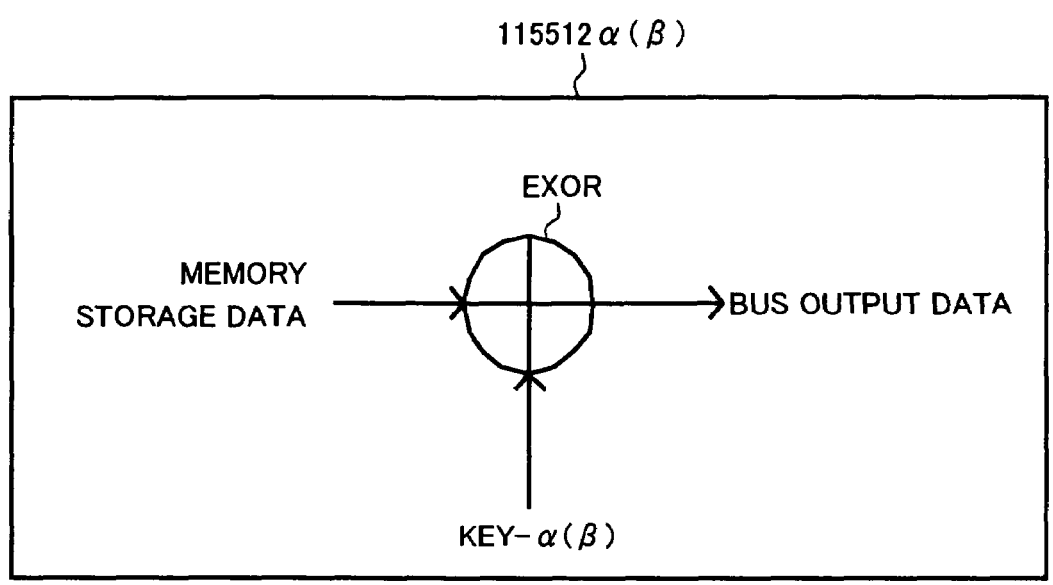
FIG. 19 is a diagram of an example of the configuration of a decoder according to the present embodiment.

The decoder 115512α (β) takes the exclusive logical. OR of the key KEY-α (β) at the exclusive logical OR gate EXOR with respect to the storage data as shown in for example FIG. 19 and decodes the data.

The encrypting of the memory storage data will be further explained.

Figure 20:
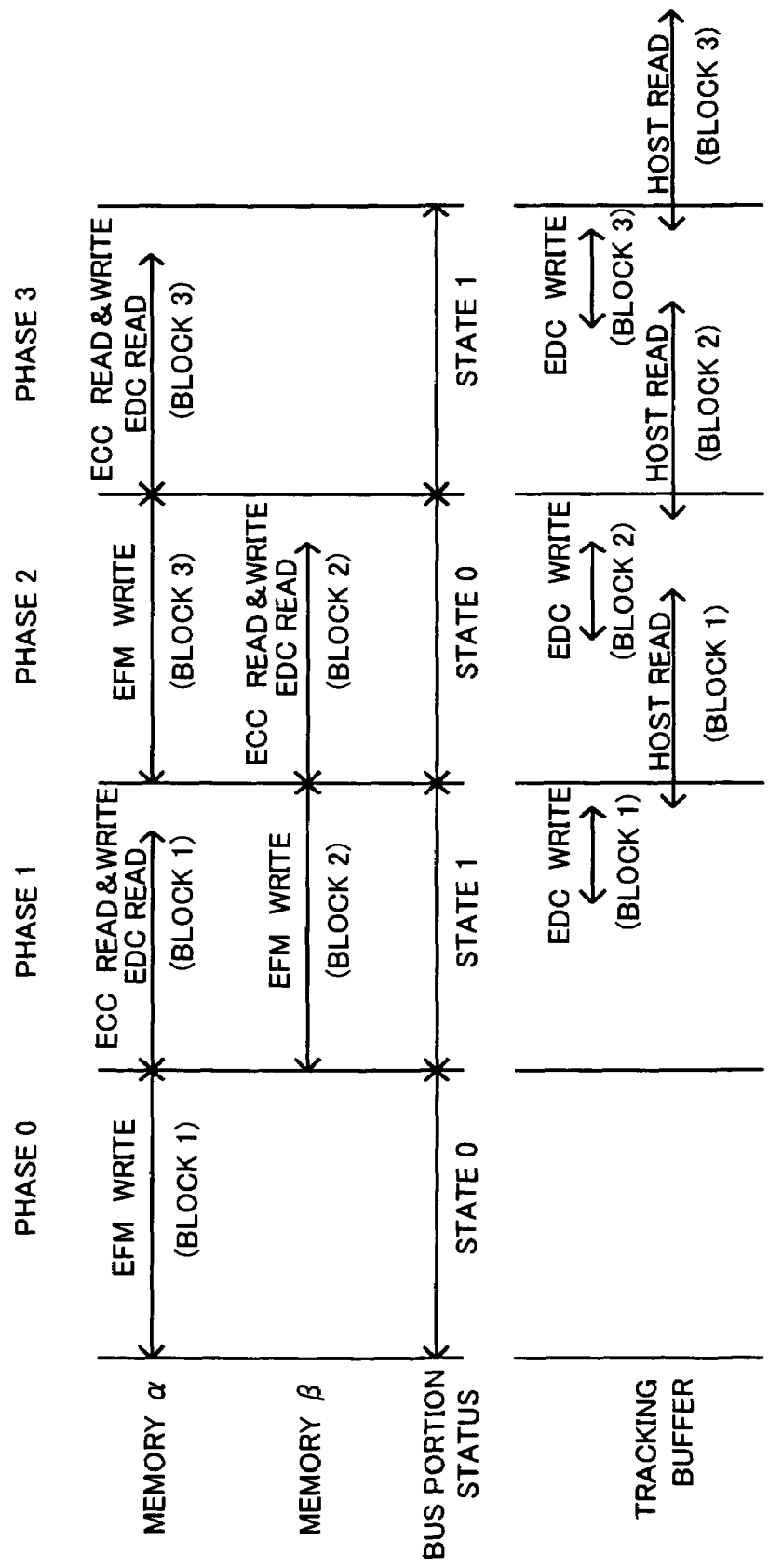
FIG. 20 is a diagram of the relationships between the decoder pipeline processing and the key information when encrypting data with a predetermined key and storing the encrypted data when storing data into a first memory and a second memory according to the present embodiment.

FIG. 20 is a diagram of the relationship between the decoder pipeline processing and the key information. In this example, use is made of Key1, Key2, and Key3 as the key information. The decoder pipeline processing of FIG. 20 proceeds in the sequence of the EFM demodulation data write processing (EFM-WR)→ECC processing (PI-RD, PO-RD)→EDC data read processing (EDC-RD), but they are processed by using the same key information. During the execution of the pipeline processing, the data is not correctly read out for data stored by using different key information. Due to this, when there is data not buffered at the time of the EFM demodulation data write processing (EFM-WR), the data stored in the EFM demodulation data write processing (EFM-WR) the previous time or before is read out. However, this is data stored by using different key information, so the read value becomes incorrect. Accordingly, error correction becomes impossible.

In general, when the error correction is performed by a product code, information that correction of the inner-code (PI) is not possible is used as the extinction flag and the outer-code (PO) is corrected. When not encrypting the memory storage data when adopting this method, the following problems can be considered.

When there is data which is not buffered due to disturbance of the PLL, disturbance of sync protection, etc. at the time of the EFM demodulation data write processing (EFM-WR), the data of the related portion becomes the data stored the previous time or before. When that data is the data corrected for error (OK), at the time of correction of error of the inner-code, it is determined as corrected for error. That is, error will never be unable to be corrected. For this reason, a extinction correction flag cannot be established at the time of outer code correction, so sometimes the error correction capability ends up declining. Further, generally, sometimes transfer for a transfer request of the host apparatus 117 is performed by inspecting the EDC check state without inspecting the error correction state. In such a case, if there is the above buffering loss, that portion of the data becames data stored the previous time or before and is undesired data designated as good by the EDC check (OK), therefore sometimes is erroneously transferred to the host apparatus 117. The case described above can be prevented by encrypting the memory storage data with the key information inherent in one series of pipeline processing.

The encrypting/decoding of the memory storage data means that if the key is correct, the data can be correctly be read from and written into the memory, but if the key is erroneous, since the key with respect to the originally stored data and the key with respect to the data at the time of the new read and write operation will become different, even if the memory is accessed, the result will be erroneous. Due to this, the transfer of erroneous data to the host apparatus 117 and the decline of the error correction capability can be prevented.

The bus portion 1156 has the function of switching the data transfer path between the EFM+demodulator 1151, the EFM+modulator 1152, and the error corrector 1153 with the first memory and the second memory of the memory portion 1155 in accordance with the status information ST0 and ST1 as mentioned above.

Figure 21:
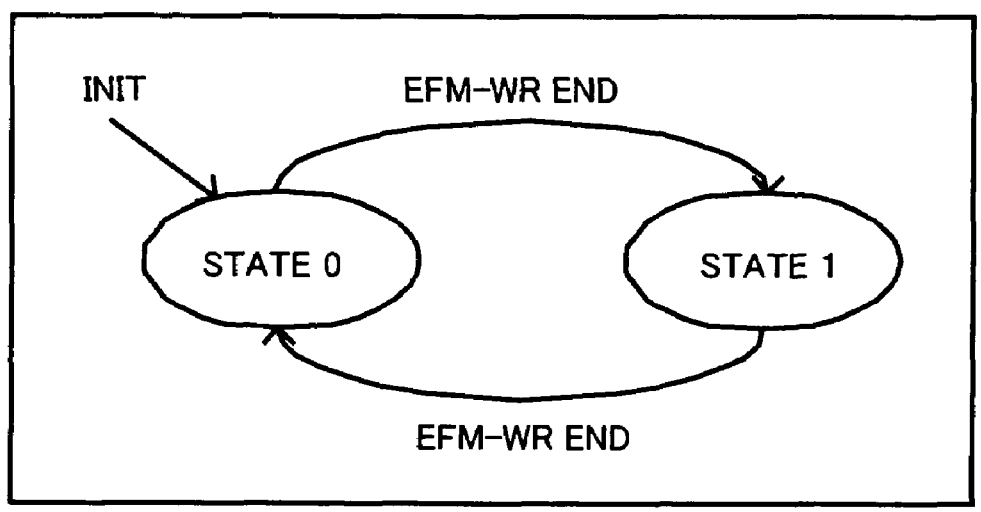
FIG. 21 is a diagram for explaining a state of alternate switching of a state 0 and state 1 at the time of decoding.

At the time of decoding, as shown in FIG. 21, the initial state becomes the state 0. When the demodulation data write processing (EFM-WR) in the state 0 ends, the state becomes the state 1. Then, when the demodulation data write processing (EFM-WR) in the state 1 ends, the state-becomes the state 0. In this way, for every end of the EFM demodulation data write processing (EFM-WR), the state 0 and the state 1 are successively switched.

Figure 22:
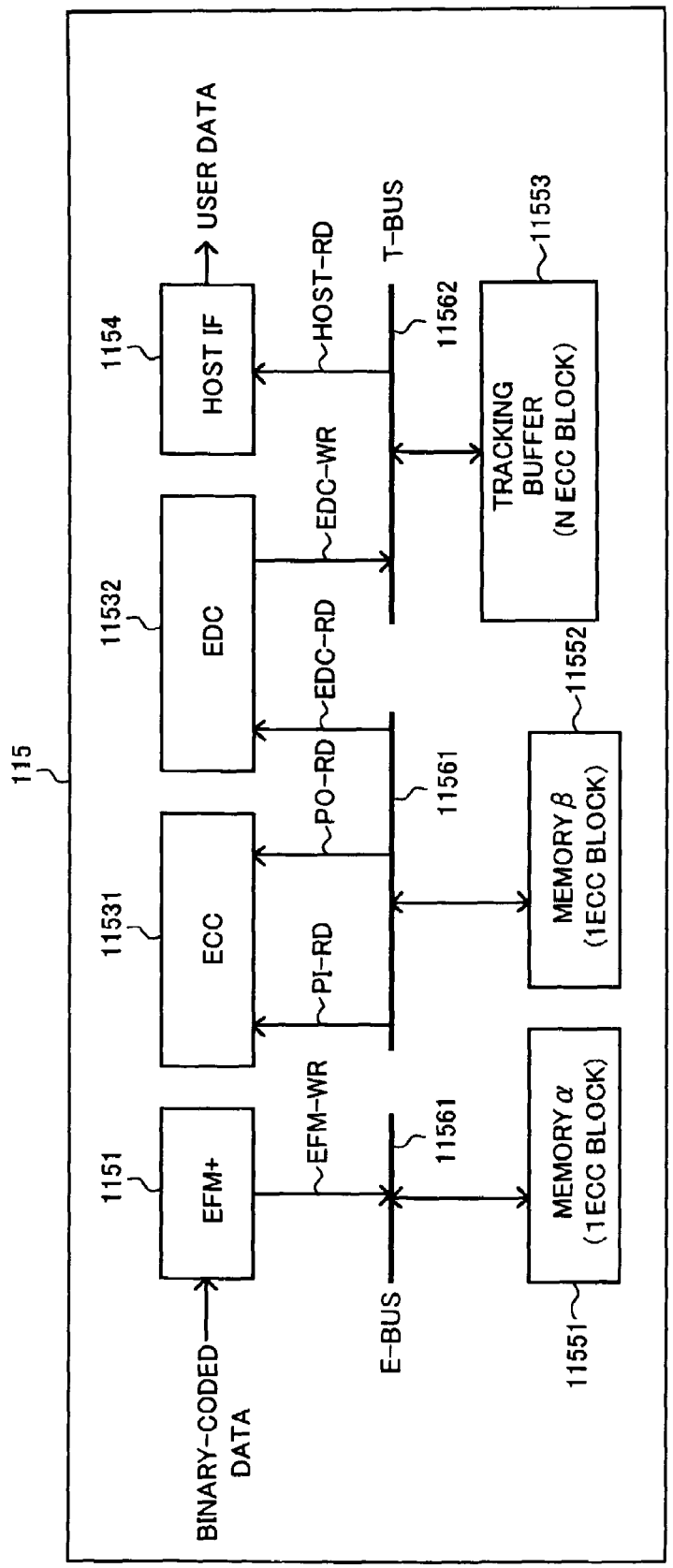
FIG. 22 is a diagram of a connection configuration of first to third memories of a memory portion and a pipeline processing circuit, constituted by an EFM demodulator, an ECC circuit, an EDC circuit, and a host interface circuit, by the bus portion when the status information ST0 is actively supplied at the time of decoding.

FIG. 22 is a diagram of the state of connection of the first to third memories of the memory portion and the pipeline processing circuit, constituted by the EFM+demodulator 1151, the ECC circuit 11531, the EDC circuit 11532, and the host interface circuit 1154, by the bus portion when the status information ST0 is actively supplied at the time of decoding. Further, FIG. 23 is a diagram of the state of connection of the first to third memories of the memory portion and the pipeline processing circuit, constituted by the EFM+demodulator 1151, the ECC circuit 11531, the EDC circuit 11532, and the host interface circuit 1154, by the bus portion when the status information ST1 is actively supplied at the time of decoding.

At the time of the state 0, as shown in FIG. 22, the first bus 11561 of the bus portion 1156 forms the data transfer path of the EFM+demodulation data to be written into the first memory (memory α) from the EFM+demodulator 1151, while forms the transfer paths of the data of the read processing of the PI code (PI-RD), the read processing of the PO code (PO-RD), and the EDC data read processing (EDC-RD) between the ECC circuit 11531 and the EDC circuit 11532 and the second memory (memory β) 11552. Further, it forms the transfer paths of the read/write processing for the PI error correction and the read/write processing for the PO error correction. Further, at the time of the state 0, as shown in FIG. 22, the second bus 11562 of the bus portion 1156 forms the data transfer path of the EDC data write processing (EDC-WR: actually the write processing of the scrambled data) from the EDC circuit 11532 to the third memory (tracking buffer) 11553 and the data transfer path from the third memory (tracking buffer) 11553 to the host interface circuit 1154.

Figure 23:
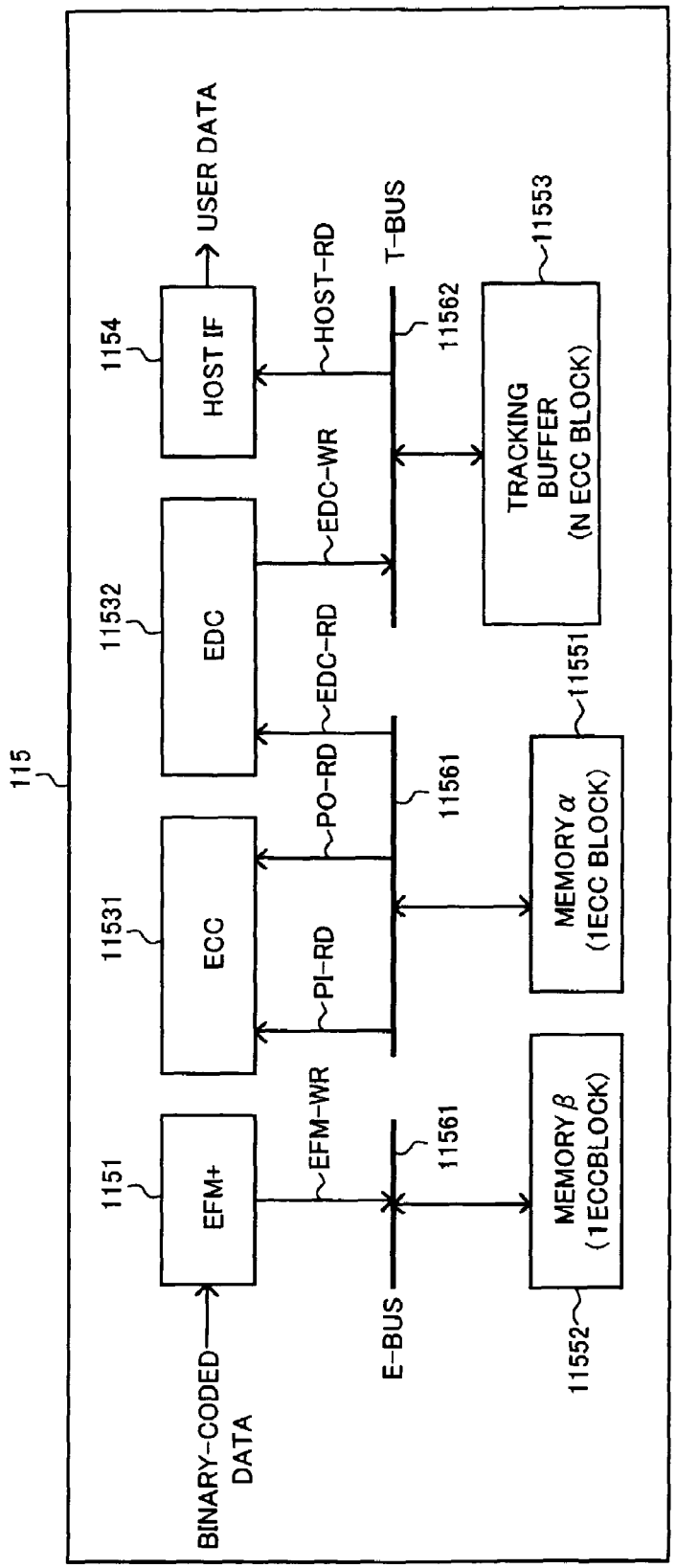
FIG. 23 is a diagram of a connection configuration of first to third memories of a memory portion and a pipeline processing circuit, constituted by an EFM demodulator, an ECC circuit, an EDC circuit, and a host interface circuit, by the bus portion when the status information ST1 is actively supplied at the time of decoding.

At the time of the state 1, as shown in FIG. 23, the first bus 11561 of the bus portion 1156 forms the data transfer path of the EFM+demodulation data to be written from the EFM+demodulator 1151 to the second memory (memory β) 11552, while forms the transfer paths of the data of the read processing of the PI code (PI-RD), the read processing of the PO code (PO-RD), and the read processing of the EDC data (EDC-RD) between the ECC circuit 11531 and EDC circuit 11532 and the first memory (memory α) 11551. Further, it forms the transfer paths of the read/write processing for the PI error correction and the read/write processing for the PO error correction. Further, at the time of the state 1, as shown in FIG. 23, in the same way as the time of state 0, the second bus 11562 of the bus portion 1156 forms the data transfer path of the EDC data write processing (EDC-WR, actually the write processing of the scrambled data) from the EDC circuit 11532 to the third memory (tracking buffer) 11553 and the data transfer path from the third memory (tracking buffer) 11553 to the host interface circuit 1154.

Figure 24:
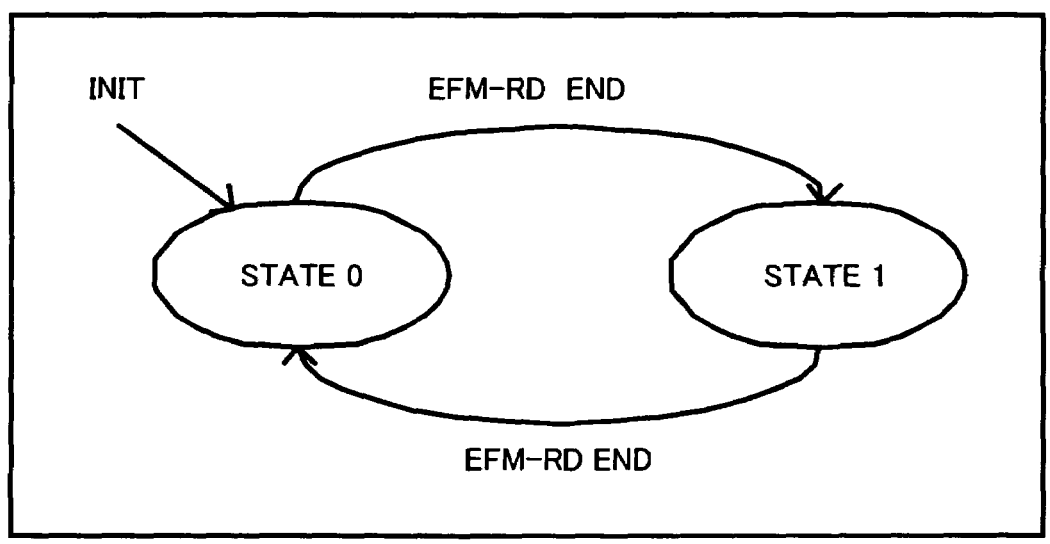
FIG. 24 is a diagram for explaining a state of alternate switching of a state 0 and state 1 at the time of encoding.

At the time of encoding as well, as shown in FIG. 24, the initial state becomes the state 0. When the data read processing before EFM+modulation (EFM-RD) in the state 1 is ended, the state becomes the state 1. Then, when the data read processing before the EFM+modulation (EFM-RD) in the state 1 is ended, the state becomes the state 0. In this way, for every end of the data read processing before the EFM+modulation (EFM-RD), the state 0 and the state 1 are successively switched.

Figure 25:
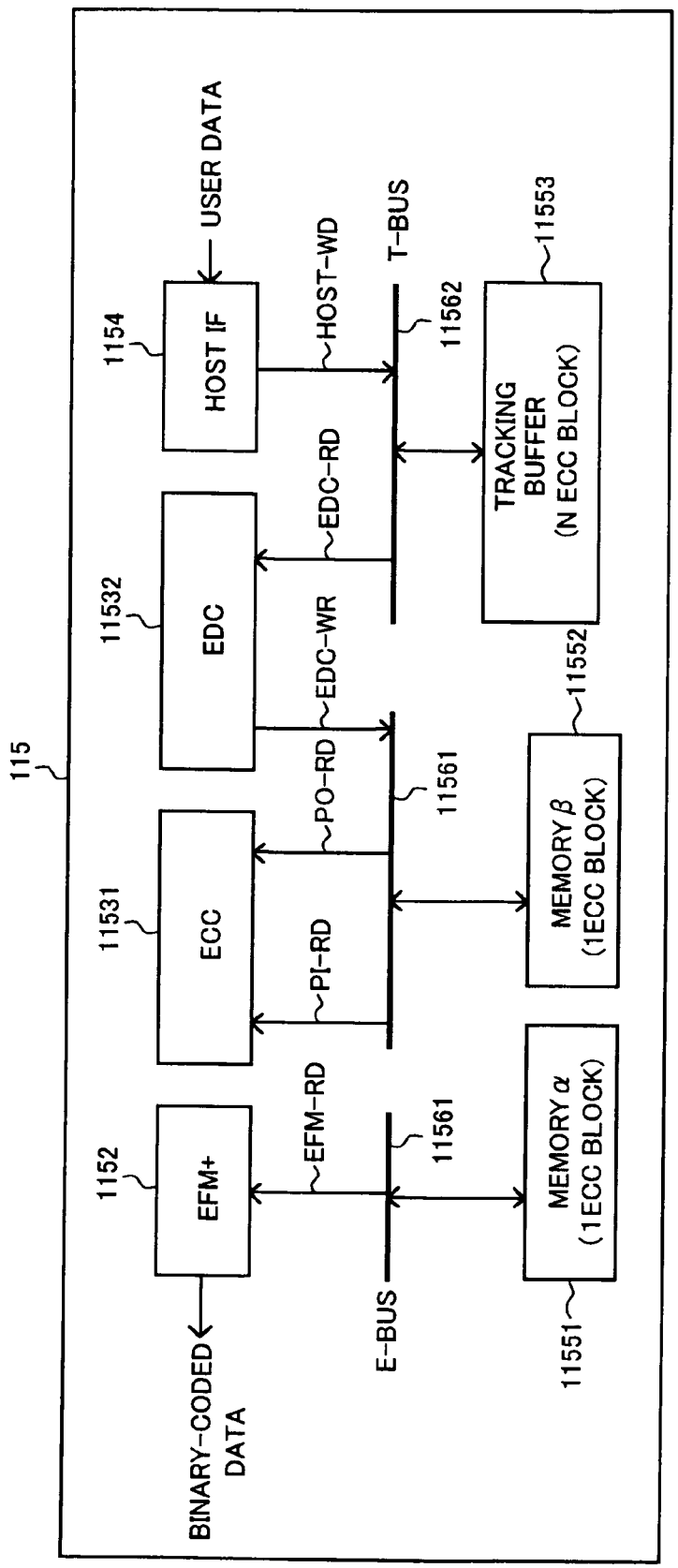
FIG. 25 is a diagram of a connection configuration of first to third memories of a memory portion and a pipeline processing circuit, constituted by an EFM demodulator, an ECC circuit, an EDC circuit, and a host interface circuit, by a bus portion when the status information ST0 is actively supplied at the time of encoding.

FIG. 25 is a diagram of the state of connection of the first to third memories of the memory portion and the pipeline processing circuit, constituted by the EFM+modulator 1152, the ECC circuit 11531, the EDC circuit 11532, and the host interface circuit 1154, by the bus portion when the status information ST0 is actively supplied at the time of encoding. Further, FIG. 26 is a diagram of the state of connection of the first to third memories of the memory portion and the pipeline processing circuit, constituted by the EFM+modulator 1152, the ECC circuit 11531, the EDC circuit 11532, and the host interface circuit 1154, by the bus portion when the status information ST1 is actively supplied at the time of encoding.

At the time of the state 0, as shown in FIG. 25, the first bus 11561 of the bus portion 1156 forms the transfer path of the data to be read from the first memory (memory α) 11551 to the EFM+modulator 1152 and forms the transfer paths of the data of the read processing of the PI code (PI-RD), the read processing of the PO code (PO-RD), and the EDC data write processing (EDC-WR) between the ECC circuit 11531 and EDC circuit 11532 and the second memory (memory β) 11552. Further, at the time of the state 0, as shown in FIG. 25, the second bus 11562 of the bus portion 1156 forms the data transfer path of the EDC data read processing (EDC-RD) from the third memory (tracking buffer) 11553 to the EDC circuit 11532 and the data transfer path from the host interface circuit 1154 to the third memory (tracking buffer) 11553.

Figure 26:
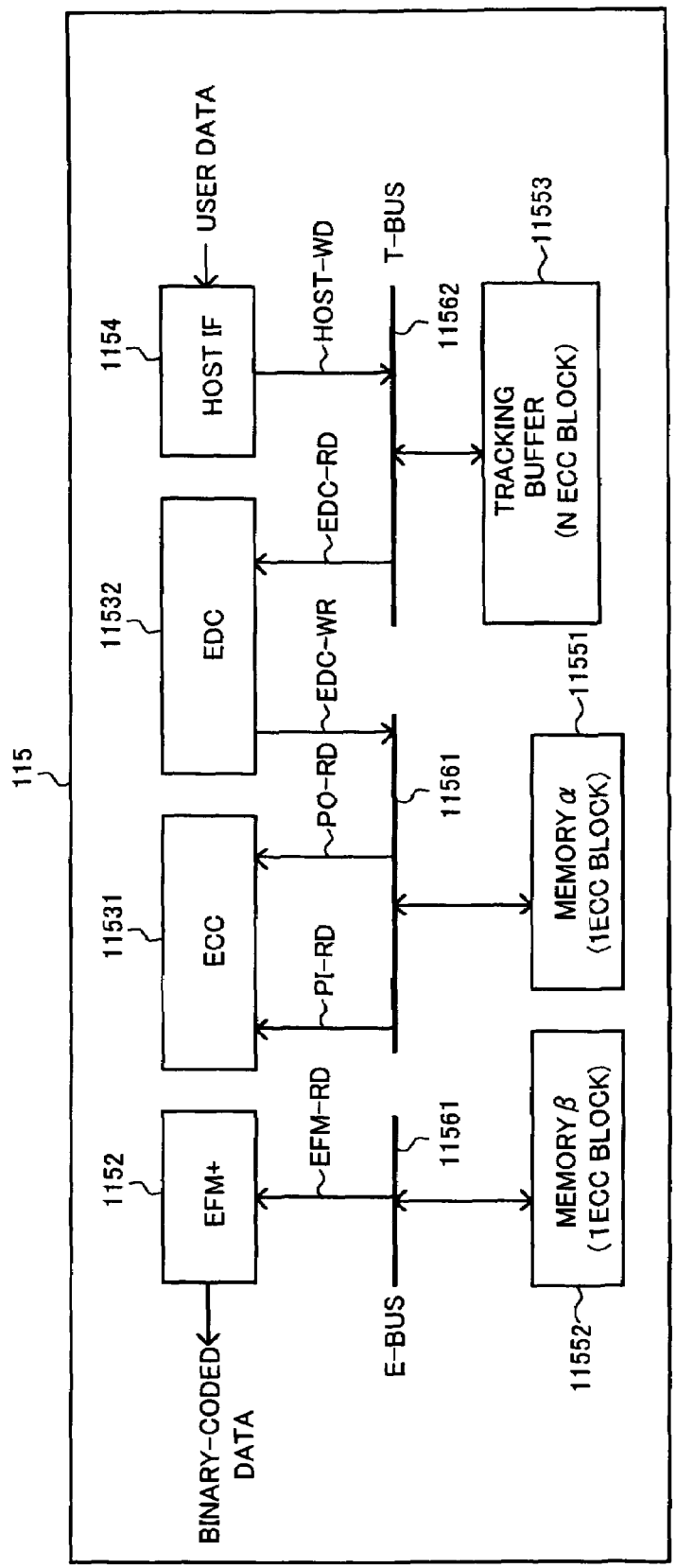
FIG. 26 is a diagram of a connection configuration of first to third memories of a memory portion and a pipeline processing circuit, constituted by an EFM demodulator, an ECC circuit, an EDC circuit, and a host interface circuit, by a bus portion when the status information ST1 is actively supplied at the time of encoding.

At the time of the state 1, as shown in FIG. 26, the first bus 11561 of the bus portion 1156 forms the transfer path of the data to be read from the second memory (memory β) 11552 to the EFM+modulator 1152 and forms the transfer paths of the data of the read processing of the PI code (PI-RD), the read processing of the PO code (PO-RD), and the EDC data write processing (EDC-WR) between the ECC circuit 11531 and EDC circuit 11532 and the first memory (memory α) 11551. Further, at the time of the state 1, as shown in FIG. 26, the second bus 11562 of the bus portion 1156 forms the data transfer path of the EDC data read processing (EDC-RD) from the third memory (tracking buffer) 11553 to the EDC circuit 11532 and the data transfer path from the host interface circuit 1154 to the third memory (tracking buffer) 11553.

Figure 27:
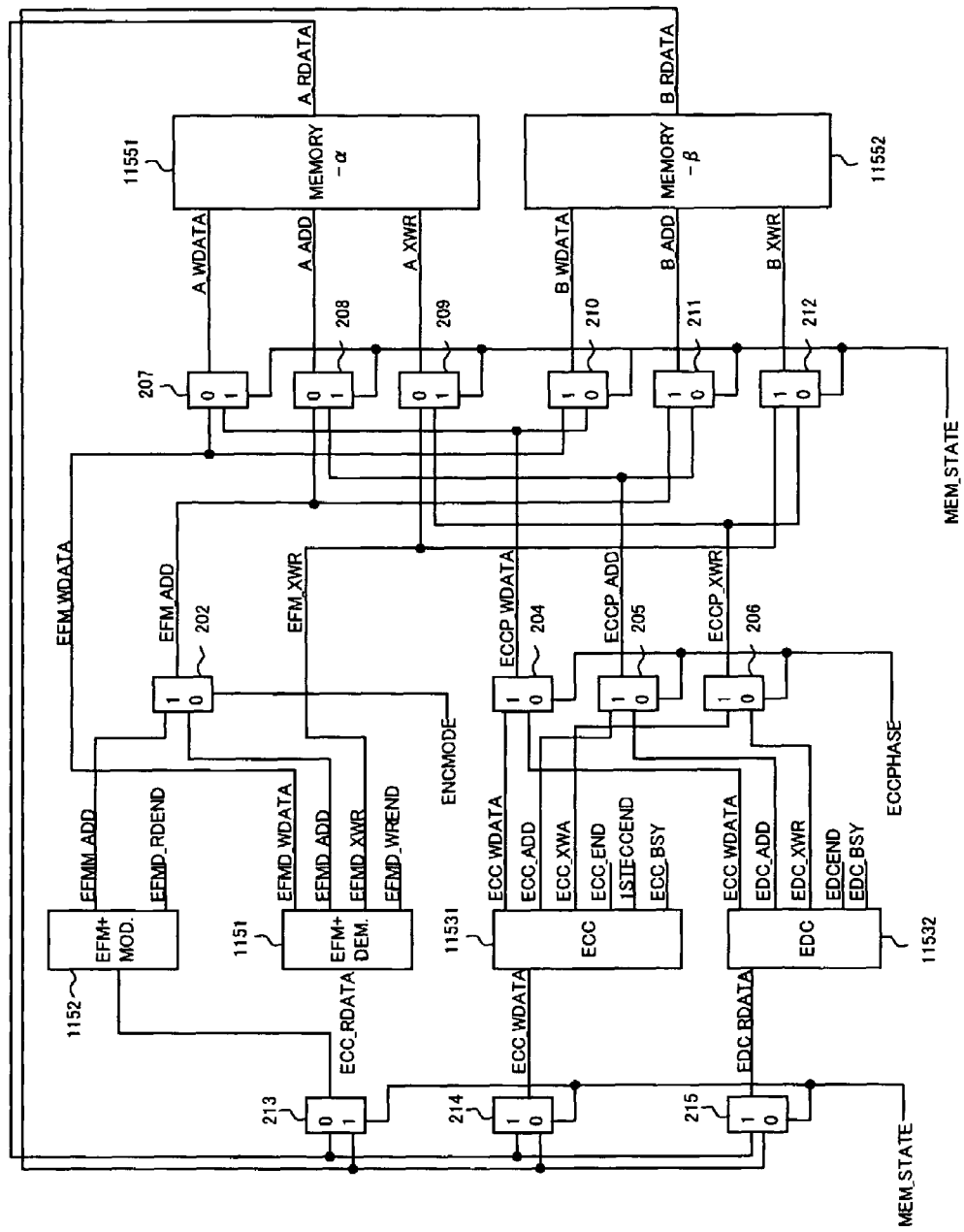
FIG. 27 is a circuit diagram of a concrete example of the configuration of a first bus of the bus portion according to the present embodiment.
Figure 28:
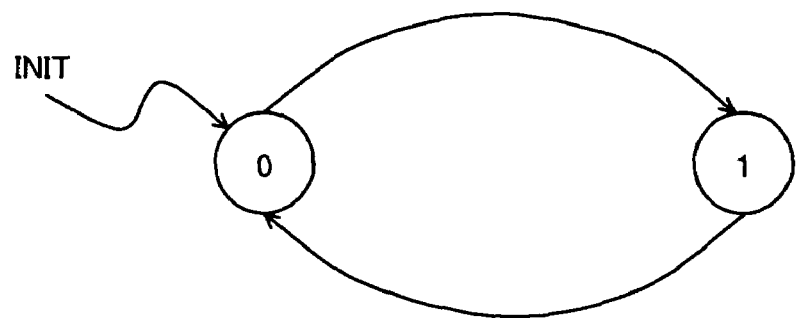
FIG. 28 is a diagram of a state transition of a state 0 and state 1 at the time of "MEM-STATE" of the first bus of the bus portion according to the present embodiment.
Figure 29:
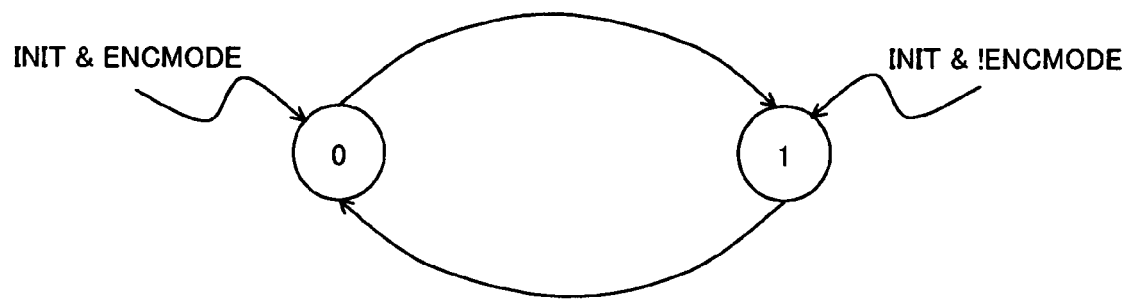
FIG. 29 is a diagram of a state transition of a state 0 and a state 1 at the time of "ECCPHASE" of the first bus of the bus portion according to the present embodiment.
Figure 30:
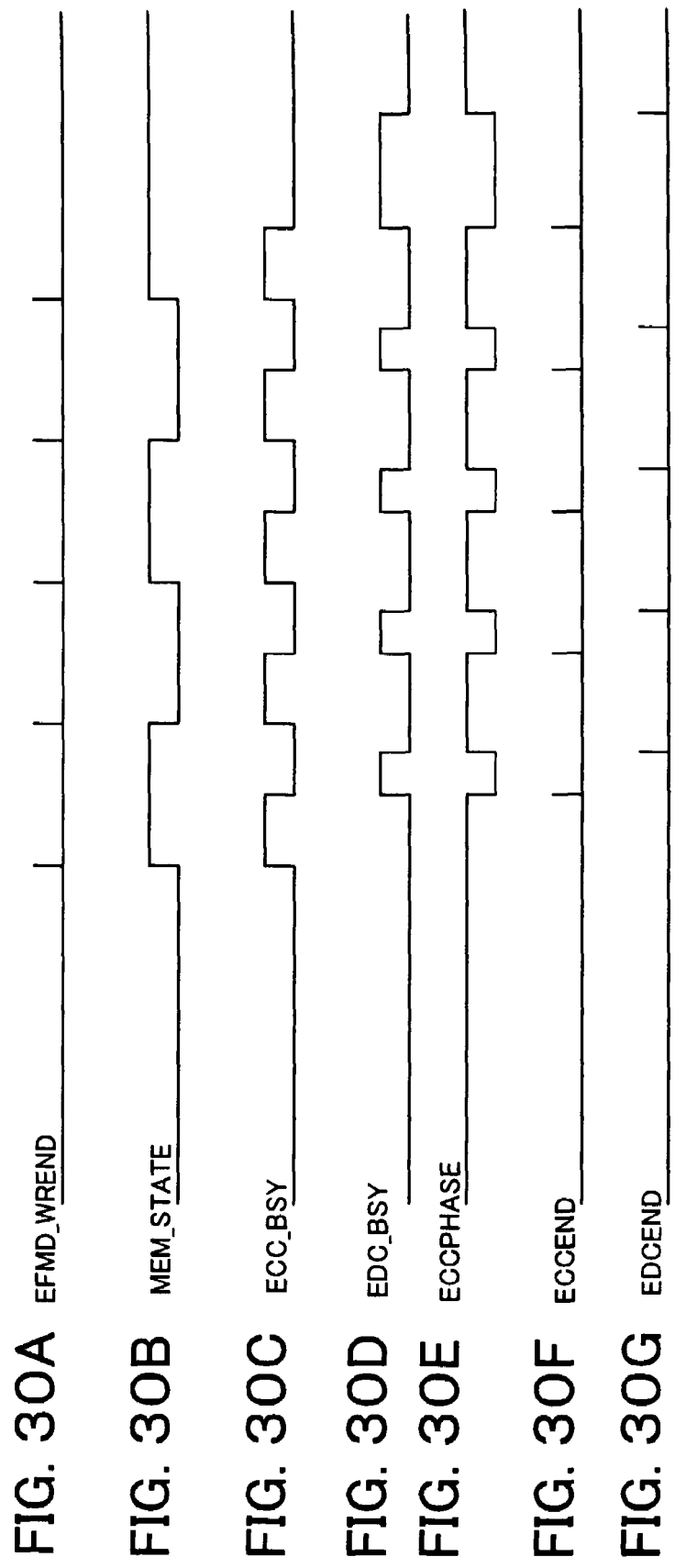
FIGS. 30A to 30G are timing charts at the time of decoding of the circuit of FIG. 27.
Figure 31:
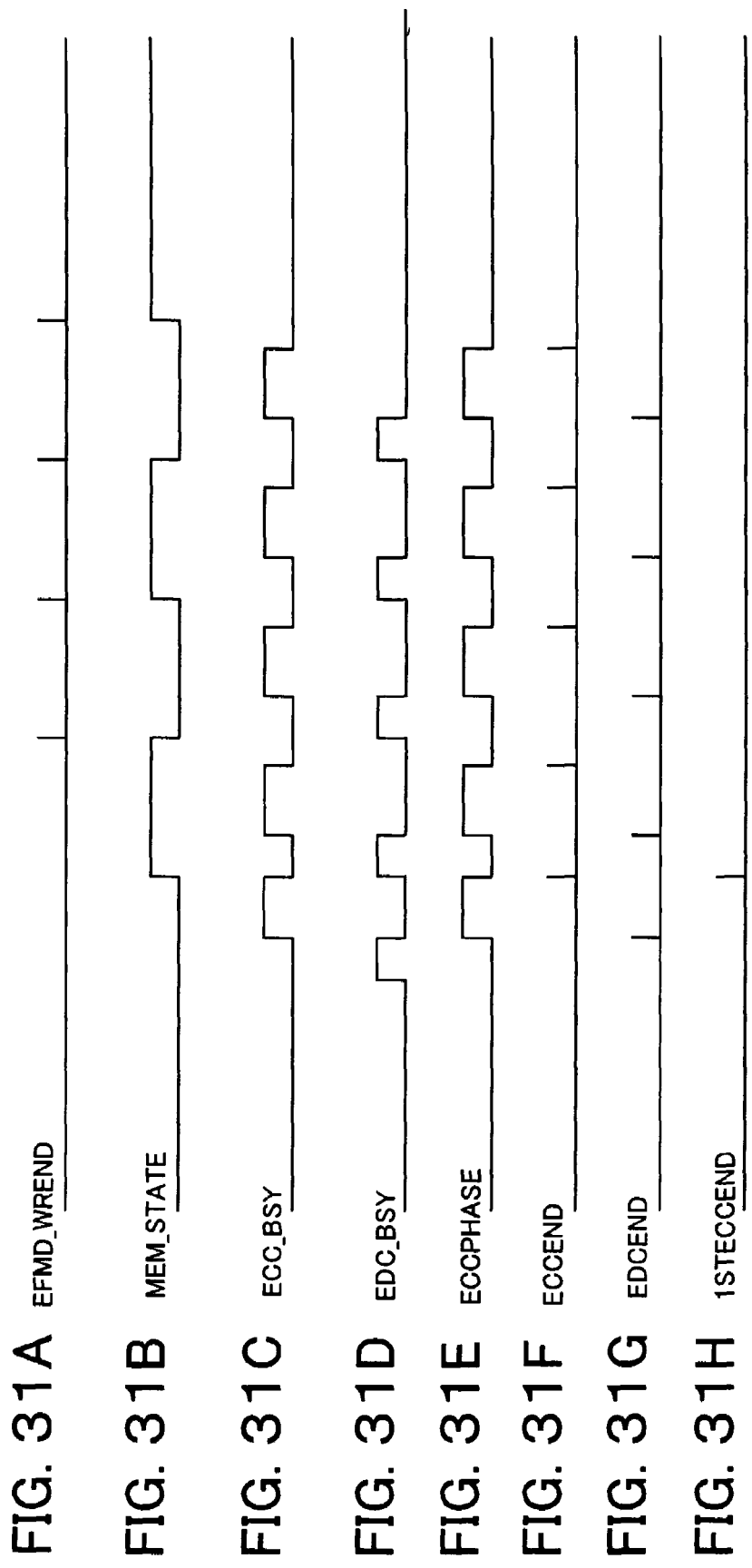
FIGS. 31A to 31H are timing charts at the time of encoding of the circuit of FIG. 27.

FIG. 27 is a circuit diagram of a concrete example of the configuration of the first bus of the bus portion according to the present embodiment. FIG. 28 is a diagram of a state transition between the state 0 and the state 1 at the time of "MEM-STATE" of the first bus of the bus portion according to the present embodiment; and FIG. 29 is a diagram of a state transition between the state 0 and the state 1 at the time of "ECCPHASE" of the first bus of the bus portion according to the present embodiment. Further, FIGS. 30A to 30H are timing charts at the time of the decoding of the circuit of FIG. 27; and FIGS. 31A to 31H are timing charts at the time of the encoding of the circuit of FIG. 27.

The first bus 11561 of the bus portion 1156 has, as shown in FIG. 27, selectors 201 to 215.

The selector 202 selects either of the address data EFM-D_ADD of the EFM+demodulator 1151 or the address data EFMM_ADD of the EFM+modulator 1152 in accordance with the level of the signal ENCMODE and outputs it as the address data EFM ADD to the selectors 208 and 211.

The selector 204 selects either of the write data ECC_WDATA of the ECC circuit 11531 or the write data EDC_WDATA of the EDC circuit 11532 in accordance with the level of the signal ECCPHASE and outputs it as the write data ECCP_WDATA to the selectors 207 and 210. The selector 205 selects either of the address data ECC_ADD of the ECC circuit 11531 or the address data EDC_ADD of the EDC circuit 11532 in accordance with the level of the signal ECCPHASE and outputs it as the address data ECCP_ADD to the selectors 208 and 211. The selector 206 selects either of the data ECC_XWA of the ECC circuit 11531 or the data EDC_XWR of the EDC circuit 11532 in accordance with the level of the signal ECCPHASE and outputs it as the data EDC_XWR to the selectors 209 and 212.

The selector 207 selects either of the write data EFMD_WDATA by the EFM+demodulator 1151 or the write data ECCP_WDATA by the selector 204 in accordance with the level of the signal MEM_STATE and outputs it as the write data A_WDATA to the first memory (memory α) 11551. The selector 208 selects either of the address data EFM_ADD by the selector 202 or the address data ECCP_ADD by the selector 205 in accordance with the level of the signal MEM_STATE and outputs it as the address data A ADD to the first memory (memory α) 11551. The selector 209 selects the data EFM_XWR by the EFM+demodulator 1151 or the address data ECCP_XWR by the selector 206 in accordance with the level of the signal MEM_STATE and outputs it as the data A_XWR to the first memory (memory α) 11551.

The selector 210 selects either of the write data EFMD_WDATA by the EFM+demodulator 1151 or the write data ECCP_WDATA by the selector 204 in accordance with the level of the signal MEM_STATE and outputs it as the write data B_WDATA to the second memory (memory β) 11552. The selector 211 selects either of the address data EFM_ADD by the selector 202 or the address data ECCP_ADD by the selector 205 in accordance with the level of the signal MEM_STATE and outputs it as the address data B_ADD to the second memory (memory β) 11552. The selector 212 selects either of the data EFMD_XWR by the EFM+demodulator 1151 or the address data ECCP_XWR by the selector 206 in accordance with the level of the signal MEM_STATE and outputs it as the data B_XWR to the second memory (memory β) 11552.

When for example the signal MEM_STATE is supplied at the "0" (low level), the selectors 207 to 209 select the data supplied to the inputs "0", that is, the output data of the EFM+demodulator 1151 and the selector 202, and output the same to the first memory (memory α) 11551. When for example the signal MEM_STATE is supplied as the data "1" (high level), the selectors 207 to 209 select the data supplied to the inputs "1", that is, the output data of the selectors 204 to 206, and output the same to the first memory (memory α) 11551. When for example the signal MEM_STATE is supplied as the data "0" (low level), the selectors 210 to 212 select the data supplied to the inputs "0", that is, the output data of the EFM+demodulator 1151 and the selector 202, and output the same to the second memory (memory β) 11552. When for example the signal MEM_STATE is supplied as the data "1" (high level), the selectors 207 to 209 select the data supplied to the inputs "1", that is, the output data of the selectors 204 to 206, and output the same to the second memory (memory β) 11552.

The inputs "0" of the selectors 207 to 209 are connected to the outputs of the EFM+demodulator 1151 and the selector 202 and the inputs "1" are connected to the outputs of the selectors 204 to 206. As opposed to this, the inputs "1" of the selectors 210 to 212 are connected to the outputs of the EFM+demodulator 1151 and the selector 202 and the inputs "0" are connected to the outputs of the selectors 204 to 206. Accordingly, when the EFM data is written in the first memory 11551, the data concerning the ECC or the EDC is written in the second memory 11552, while when the data concerning ECC or EDC is written in the first memory 11551, the EFM data is written in the second memory 11552.

The selector 213 selects either of the read data A_RDATA of the first memory 11551 or the read data B_RDATA of the second memory 11552 in accordance with the level of the signal MEM_STATE and outputs it as the data EFMD_RDATA to the EFM+demodulator 1151. The selector 214 selects either of the read data A_RDATA of the first memory 11551 or the read data B_RDATA of the second memory 11552 in accordance with the level of the signal MEM_STATE and outputs it as the data ECC_WDATA to the ECC circuit 11531. The selector 215 selects either of the read data A_RDATA of the first memory 11551 or the read data B_RDATA of the second memory 11552 in accordance with the level of the signal MEM_STATE and outputs it as the data EDC_RDATA to the EDC circuit 11532.

The input "0" of the selector 213 is connected to the supply line of the read data A_DATA of the first memory 11551, and the input "1" is connected to the supply line of the read data B_DATA of the second memory 11552. On the other hand, the inputs "0" of the selectors 214 and 215 are connected to the supply line of the read data B_DATA of the second memory 11552, and the inputs "1" are connected to the supply line of the read data A_DATA of the first memory 11551. Accordingly, when the read data A_DATA of the first memory 11551 is supplied to the EFM+modulator 1152, the read data B_DATA of the second memory 11552 is supplied to the ECC circuit 11531 and the EDC circuit 11532, and when the read data A_DATA of the first memory 11551 is supplied to the ECC circuit 11531 and the EDC circuit 11532, the read data B_DATA of the second memory 11552 is supplied to the EFM+modulator 1152.

Figure 32:
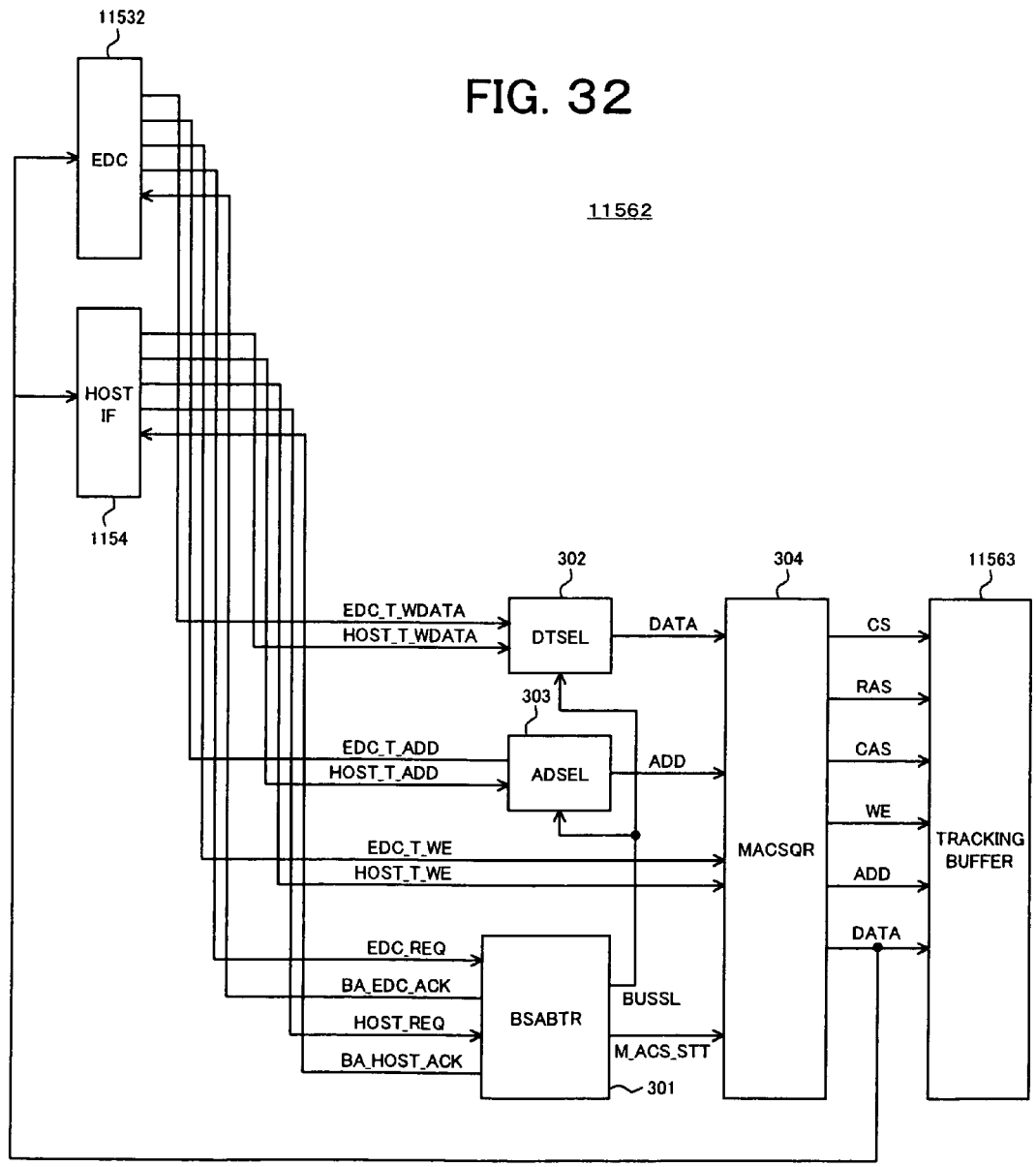
FIG. 32 is a circuit diagram of a concrete example of the configuration of a second bus of the bus portion according to the present embodiment.

FIG. 32 is a circuit diagram of a concrete example of the configuration of the second bus of the bus portion according to the present embodiment.

This second bus 11562 has, as shown in FIG. 32, a bus arbiter (BSABTR) 301, a data selector (DTSEL) 302, an address selector (ADSEL) 303, and a memory access sequencer (MACSQR) 304. The bus arbiter 301 performs the arbitration of the bus. It gives a bus access right to any one circuit in accordance with requests EDC_REQ and HOST_REQ from the EDC circuit 11532 and the host interface circuit 1154 and returns back an acknowledgement ACK. At this time, the bus arbiter 301 outputs a signal BUSSL to the data selector 302 and the address selector 303 and makes them select the write data EDC_T_WDATA or the HOST_T_WDATA and the address data EDC_T_ADD or HOST_T_ADD from either circuit between the EDC circuit 11532 and the host interface circuit 1154. Due to this, the selection data DATA is supplied from the data selector 302 to the memory access sequencer 304, and the selection address ADD is supplied from the address selector 303 to the memory access sequencer 304. When the bus arbitration is ended, the bus arbiter 301 activates the memory access sequencer 304 by the signal M_AOS_STT. The memory access sequencer 304 outputs signals CS, RAS, CAS, WE, ADD and data and performs the memory access with respect to the tracking buffer 11563 as the third memory. Further, the read data from the tracking buffer 11563 is input to the memory access sequencer 304, the EDC circuit 11532, or the host interface circuit 1154.

Below, an explanation will be given of the operation of the optical disc recording/reproducing apparatus 100 (refer to FIG. 5) having the above configuration in relation to the drawings focusing on the decoder pipeline processing and the encoder pipeline processing of the decoder/encoder circuit 115.

First, an explanation will be given of the decoder pipeline processing in relation to FIG. 33.

The data read from the disc 101 by the optical pick-up 103 and converted to an electric signal is input to the RF amplifier 106. The RF amplifier 106 performs computations on the plurality of signals transferred from the optical pick-up 103, generates the tracking error signal TE and the focus error signal FE, outputs them to the servo DSP 107, shapes the waveform of the data sequences signal (RF signal) S106, and outputs the result to the binary coding circuit 110. The servo DSP 107 performs the focus servo, tracking servo, and sled servo control for the tracking error signal TE and the focus error signal FE generated at the RF amplifier 106.

The binary coding circuit 110 digitizes the RF signal S106 from the RF amplifier 106, while the clock reproduction circuit 111 extracts the clock based on the RF signal binary-coded at the binary coding circuit 110 and inputs the RF signal as a digital signal to the decoder/encoder circuit 115. In this case, the decoder/encoder circuit 115 for performing the pipeline processing is continuously supplied with a series of data having the magnitude required at each pipeline stage in units of blocks (BLK), for example, a plurality of blocks (for example BLK1 to BLK3).

At this time, since it is the initial state, the bus portion 1156 of the decoder/encoder circuit 115 is supplied with the status information ST0 as active, so the bus portion 1156 is in the state 0 status. Accordingly, the connection path of the decoder/encoder circuit 115 is formed as shown in FIG. 22.

Figure 33:
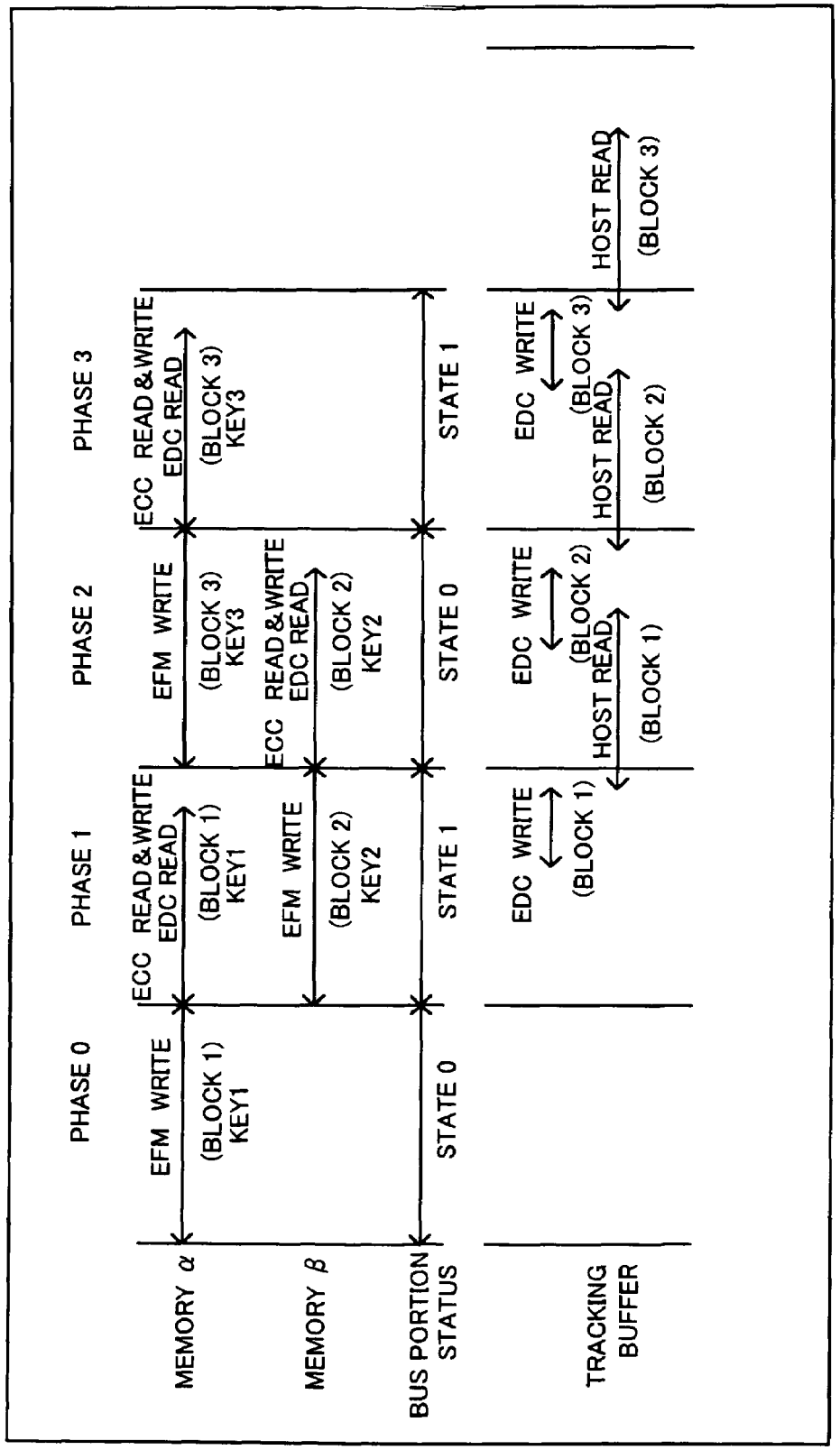
FIG. 33 is a diagram for explaining the decoder pipeline processing.

Then, as shown in FIG. 33, in phase 0, when the RF data (BLK1) binary-coded by the binary coding circuit 110 is input to the EFM+demodulation circuit 1151, it is subjected to EFM+demodulation and written into the memory α (first memory). When the write operation of the EFM+demodulation data is ended, the state transitions to the state 1, and the connection path of the decoder/encoder circuit 115 is formed as shown in FIG. 23.

At phase 1, the EFM+demodulation data is written into the memory α (first memory). On the other hand, after the error correction processing on the data stored in the memory α, the EDC check processing and the descrambling are carried out. The memory access of the error correction processing is accompanied by the read operation of the PI code, the error correction processing in accordance with the error correction result of the PI code, the read operation of the PO code, and the error correction processing in accordance with the error correction result of the PO code. According to need, the PI correction and the PO correction are repeated. The EDC, the check processing, and the descrambling are simultaneously executed. This is possible since the data read sequences are similar between the two processings. The descrambled data is not written back to the original memory, but is written into the tracking buffer (third memory) 11553. For this reason, the EDC data read processing from the memory α, and the EDC data write processing to the tracking buffer are simultaneously executed. The data written into the tracking buffer is the data after the end of the decoding. Then, according to a transfer request from the host apparatus 117, the data is transferred through the host interface circuit 1154 to the host apparatus 117. As explained above, the tracking buffer 11553 configures a ring buffer and functions as a buffer unit with respect to fluctuations in the frequency of transfer requests from the host apparatus. Alternatively, it becomes a certain type of cache memory along with the previous read processing.

The data read operation for the EDC check ends before the end of the write operation of one ECC block's worth of the EFM+data. When the write operation of one ECC block's worth of the EFM+data is ended, the status of the bus portion 1156 transitions to the state 0 again. Accordingly, the connection path of the decoder/encoder circuit 115 is formed as shown in FIG. 22.

At phase 2, a write operation of the EFM+demodulation data is carried out at the memory α, and the ECC decoding, the EDC check processing, the descrambling, etc. are carried out at the memory β.

At phase 3, the write operation of the required EFM data has been already ended, so the write operation of the EFM+demodulation data is not carried out, but the ECC decoding, the EDC check processing, the descrambling, etc. with respect to the memory α are carried out.

Figure 1:
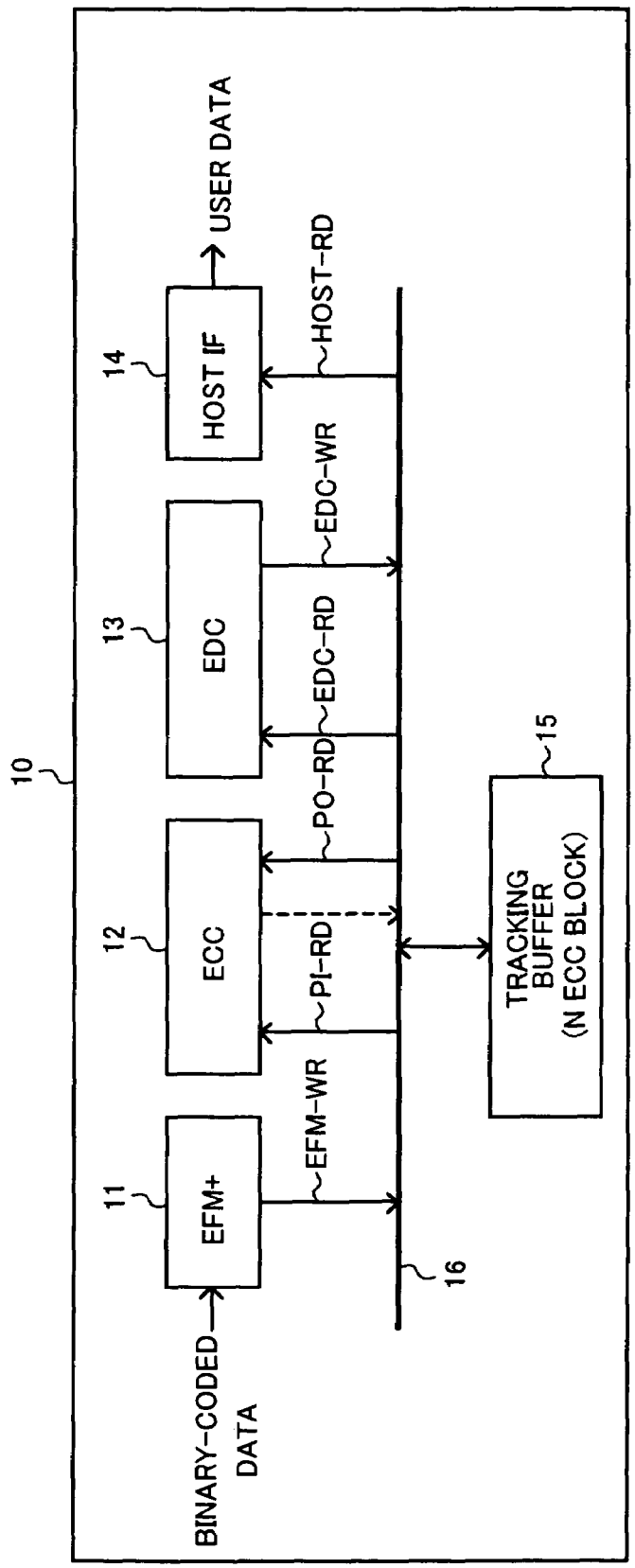
FIG. 1 is a block diagram of an example of the configuration of a general decoder circuit.
Figure 2:
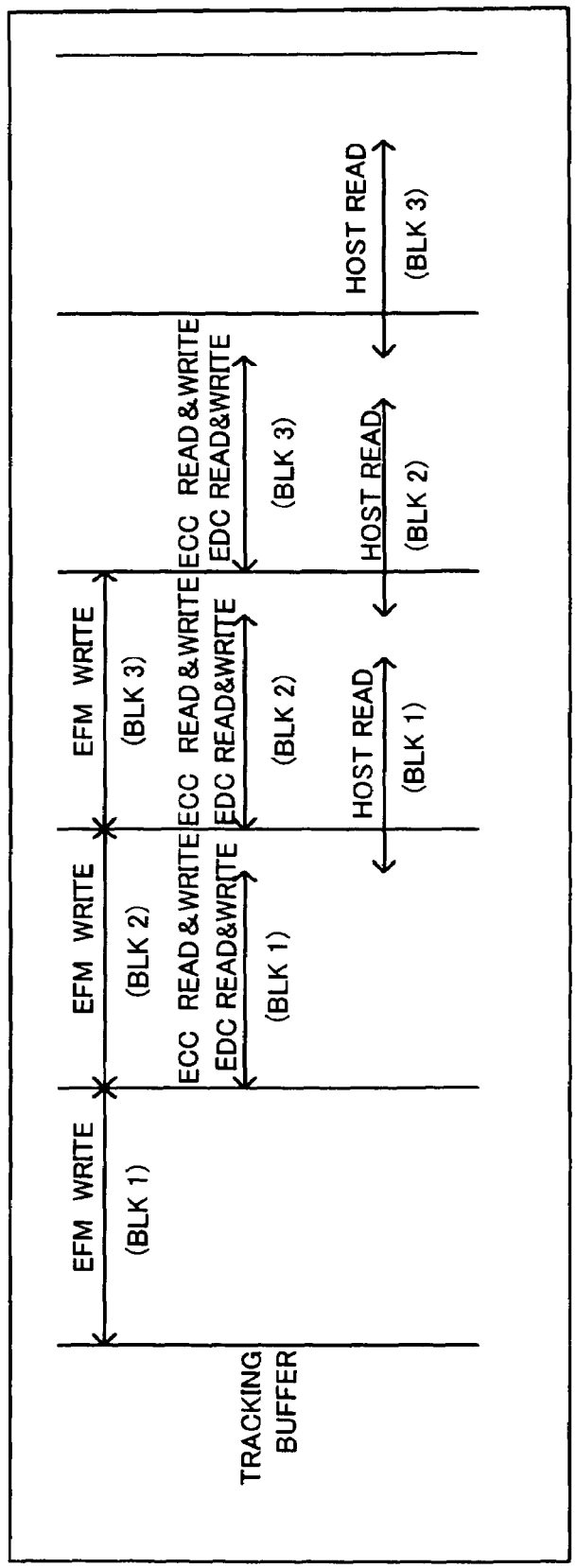
FIG. 2 is a diagram of a state of access of decoder pipeline processing with respect to a memory buffer in the circuit of FIG. 1.
Figure 34:
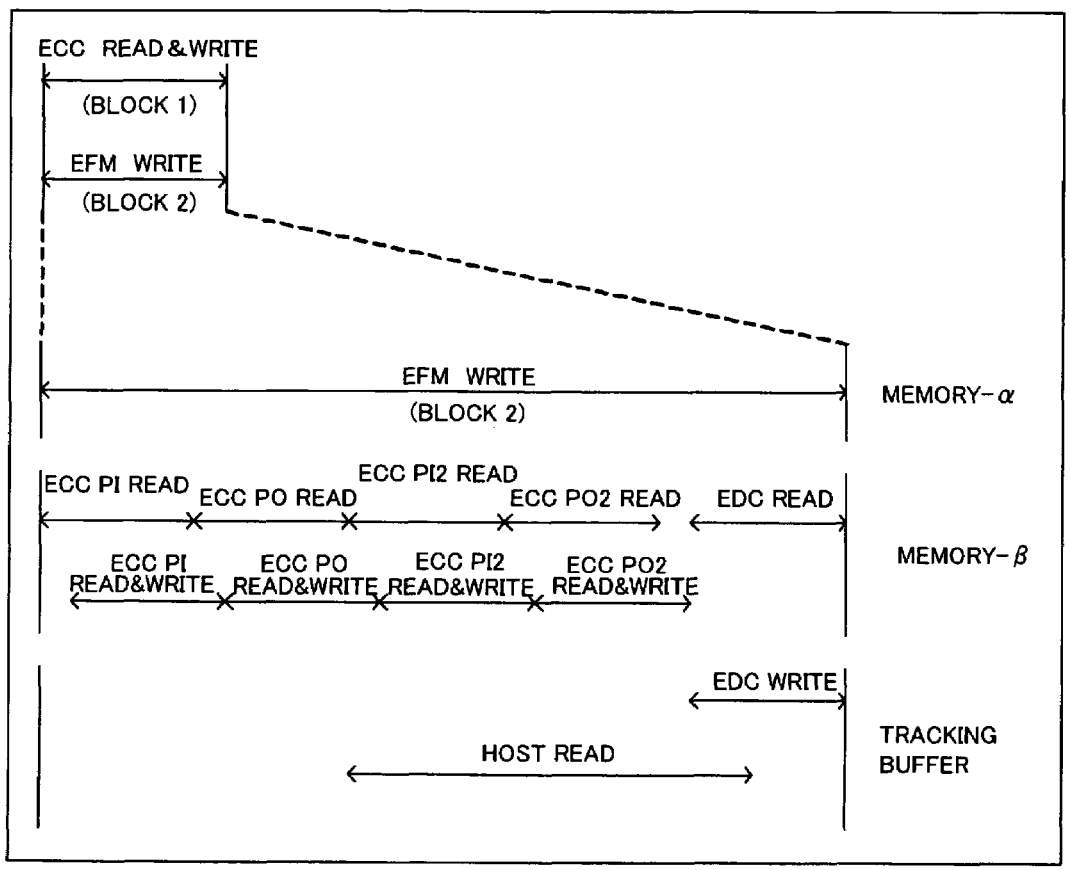
FIG. 34 is a diagram of a state of memory access at the time of decoding of the circuit according to the present embodiment.
Figure 35:
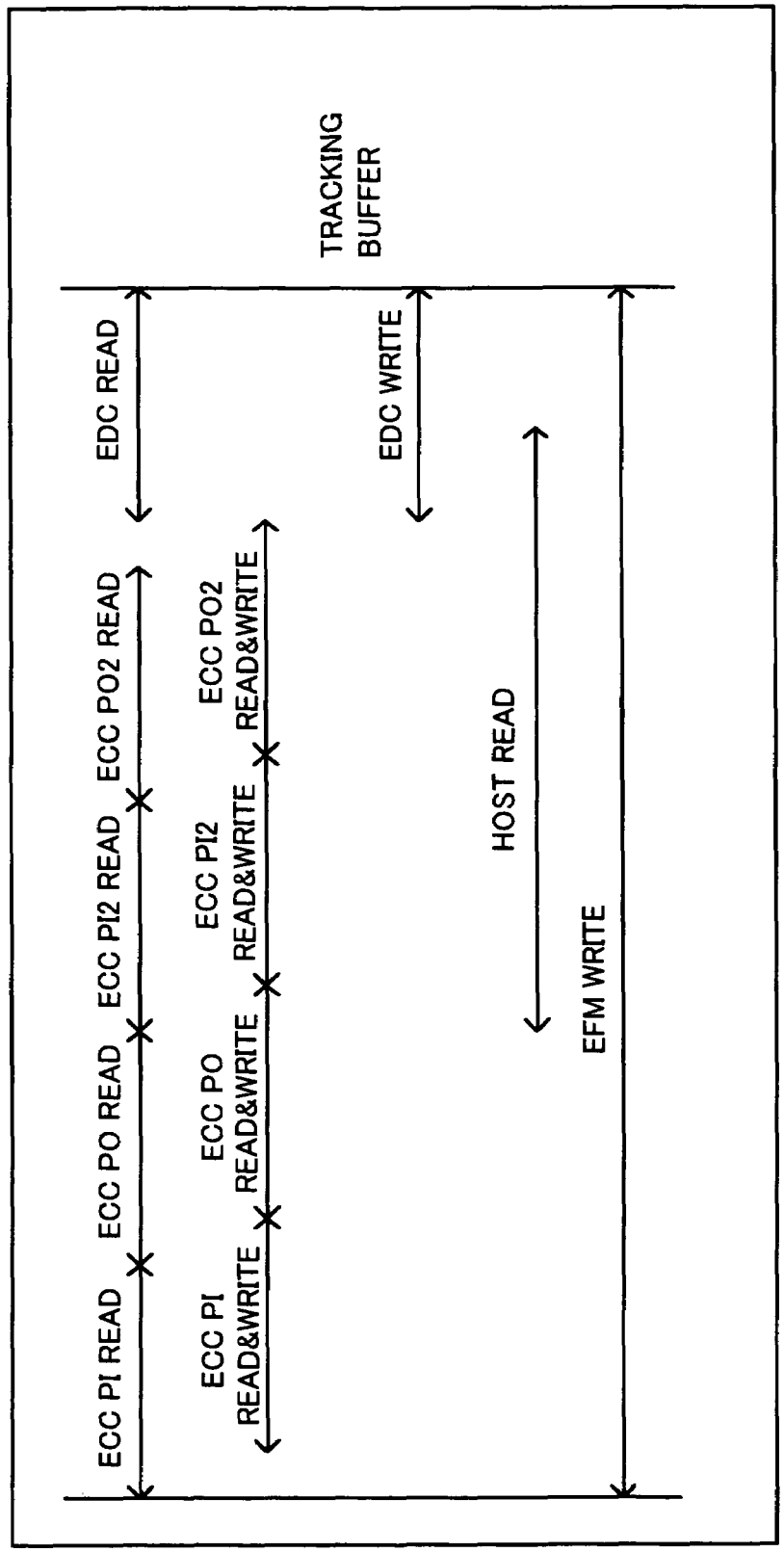
FIG. 35 is a diagram of the state of memory access of the circuit of FIG. 1.

Here, the state of memory access will be compared between the circuit according to the present embodiment and the conventional circuit of FIG. 1. FIG. 34 is a diagram of the state of memory access of the circuit according to the present embodiment; and FIG. 35 is a diagram of the state of memory access of the circuit of FIG. 1. Both show the situation when the PI and PO are repeated two times for the correction.

In the conventional circuit shown in FIG. 35, the accesses such as EFM-WR, ECC PI-RD, ECC PO-RD, ECC PI2-RD, ECC PO2-RD, ECC PI-RD&WR, ECC PO-RD&WR, ECC PI2-RD&WR, ECC PO2-RD&WR, EDC-RD, EDC-WR, HOST-WR, HOST-RD, and EFM-WR are generated with respect to a single memory. As opposed to this, in the circuit according to the present embodiment shown in FIG. 34, the memory accesses are carried out dispersed to three memories, so a bottleneck of the memory access is relieved. In FIG. 34, the memory a is accessed for the EFM-WR, the memory β is accessed for the ECC PI-RD, ECC PO-RD, ECC PI2-RD, ECC PO2-RD, ECC PI-RD&WR, ECC PO-RD&WR, ECC PI2-RD&WR, ECC PO2-RD&WR, and EDC-RD, and the tracking buffer is accessed for the EDC-WR and HOST-RD.

In general, when there are accesses overlapping in time, arbitration of the access right to the memory becomes necessary. In that case, overhead occurs accompanied with the access right arbitration. In FIG. 35, all accesses are concentrated at a single memory, so this overhead becomes large.

On the other hand, in FIG. 34, there are few overlapping memory accesses and the overhead is small. When confirming the memory accesses for FIG. 34, the memory α is accessed only for the EFM-WR, so arbitration is not required. The tracking buffer is only accessed for the EDC-WR and HOST-RD so the number of continuous accesses can be made large and the overhead can be made small. The memory β is accessed for the ECC processing and the EDC processing, but the two processings are sequentially carried out, so arbitration of the access right is not necessary. For the ECC, the code read operation and the error correction processing overlap in time, but there are few accesses for the error correction processing (Read&Write), so the overhead is still small. Further, there are accesses for the codes, but there is almost no overlap in time, so the overhead is still small. The tracking buffer is written with the decoded data. The host interface circuit 1154 transfers the decoded data to the host apparatus 117 according to a transfer request from the host apparatus 117.

Figure 36:
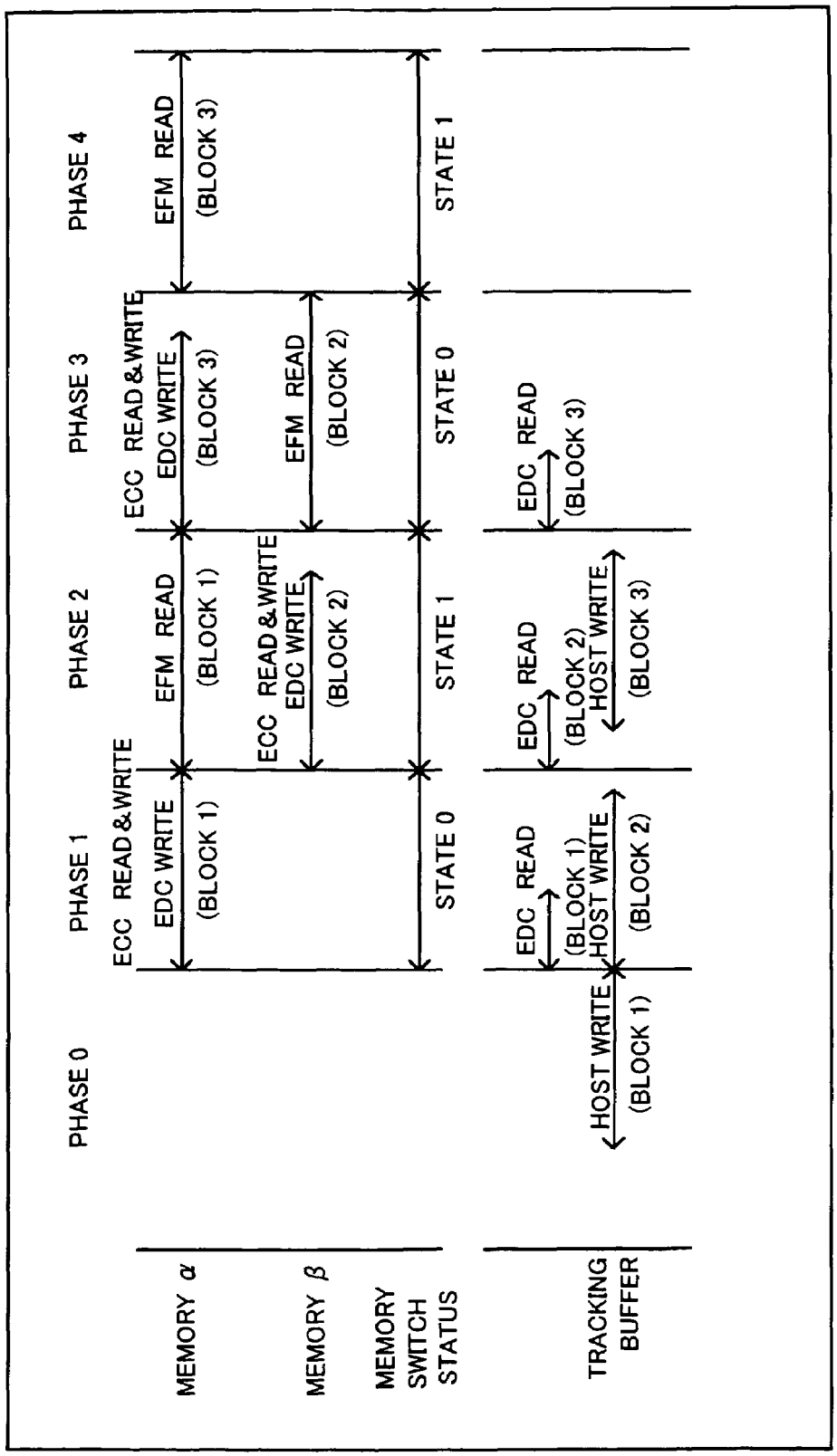
FIG. 36 is a diagram for explaining the encoder pipeline processing.

Next, an explanation will be given of the encoder pipeline processing in relation to FIG. 36 while referring to FIG. 5.

At phase 0, when the user data is input from the host apparatus 117 to the host interface circuit 1154, the user data is written into the tracking buffer 11553 through the second bus 11562. Address information and parity information other than the user data are sometimes input too, but in that case, the address generation and the parity generation operation are omitted. When the write operation of the user data is ended, the encoding starts.

At this time, the state is the initial state, therefore the bus portion 1156 of the decoder/encoder circuit 115 is actively supplied with the status information ST0, and the bus portion 1156 is in the state 0 status. Accordingly, the connection path of the decoder/encoder circuit 115 is formed as shown in FIG. 25.

At phase 1, the tracking buffer 11553 reads out the user data, and the EDC circuit 11532 performs the scrambling, the EDC parity generation, the ID generation, various types of information generation, etc. and writes the scrambled user data, EDC parity, ID, and various types of field information into the memory α. The EDC parity generation and the scrambling are simultaneously executed. This is possible since the data read sequences are similar between two processings. The scrambled data is not written back to the original memory, but is written into the tracking buffer. For this reason, the EDC data read processing from the tracking buffer and the EDC data write processing into the memory α (first memory) are simultaneously executed. The EDC parity is added to the data stored in the memory α. The memory access of the encoding is accompanied by the read operation of the PI code, the rewrite processing of the parity portion of the PI code, the read operation of the PO code, and the parity portion rewrite processing of the PO code.

At phase 2, the read operation with respect to the data stored in the memory α and the EFM+modulation with respect to the read data are carried out. The data subjected to the EFM+modulation is output as a binary-coded signal, and the write processing to the disc is carried out. When the read operation for the EFM+modulation ends, the state changes to the state 1, and the connection path of the decoder/encoder circuit 115 is formed as shown in FIG. 26.

On the other hand, the memory β (second memory) is subjected to the write processing of the scrambled user data, EDC parity, ID, and various types of field information, the ECC parity addition processing, etc.

At phase 3, the memory α is subjected to the write processing of the scrambled user data, EDC parity, ID, and various types of field information, the ECC parity addition processing, etc. On the other hand, the data read operation for the EFM+demodulation with respect to the data stored in the memory β is carried out.

At phase 4, there is no data remaining in the tracking buffer, so the ECC parity addition processing etc. are not carried out. On the other hand, the data read operation for the EFM+demodulation with respect to the data stored in the memory α is carried out.

Figure 3:
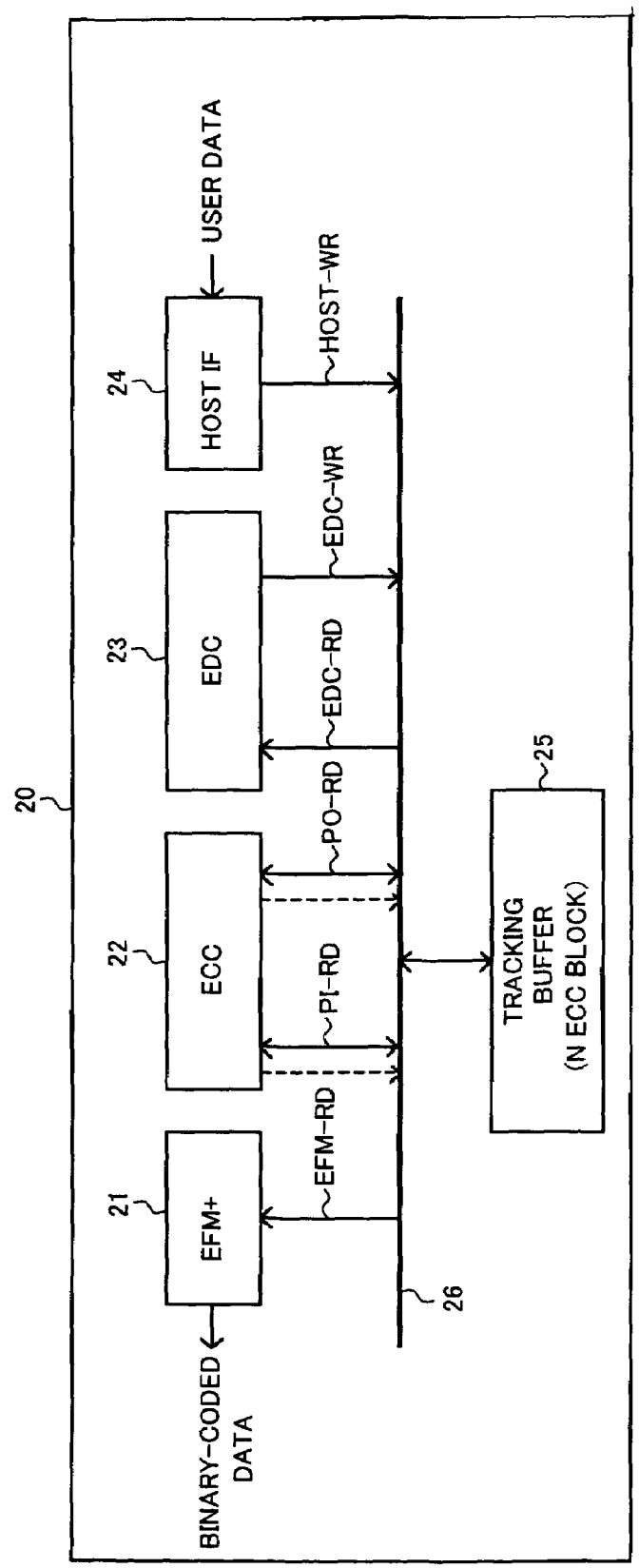
FIG. 3 is a block diagram of an example of the configuration of a general encoder circuit.
Figure 4:
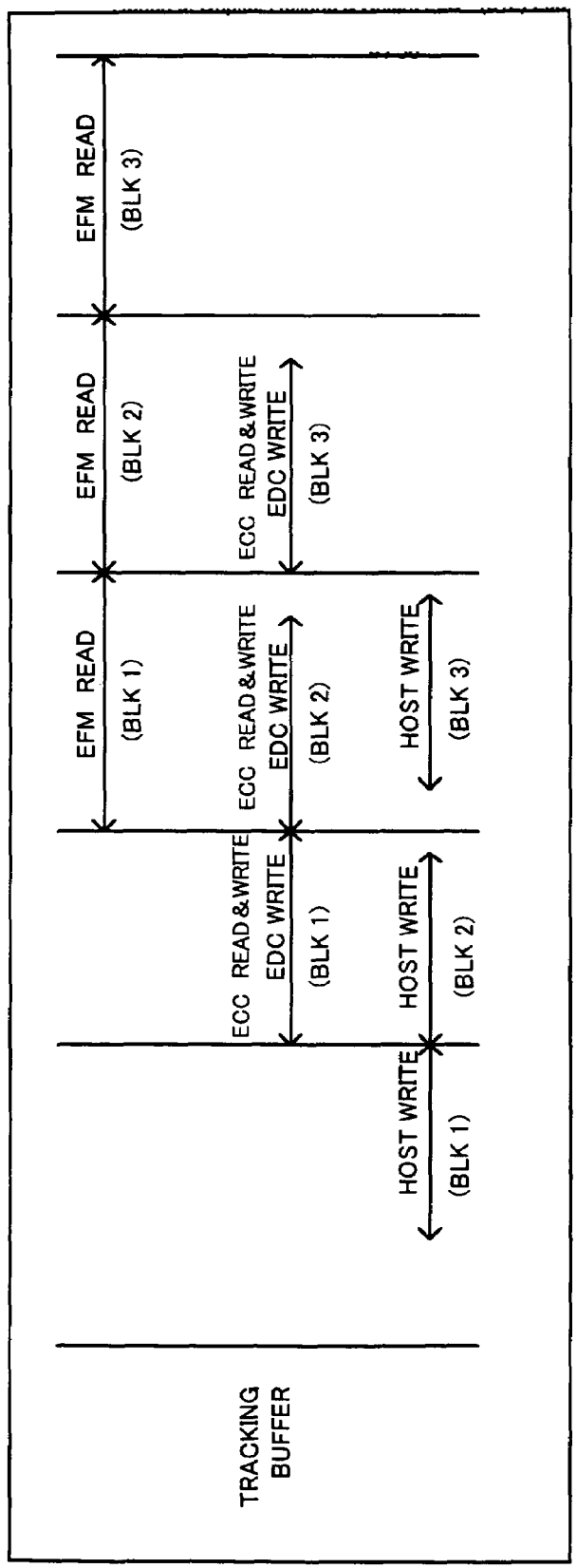
FIG. 4 is a diagram of a state of access of encoder pipeline processing with respect to a memory buffer in the circuit of FIG. 3.
Figure 37:
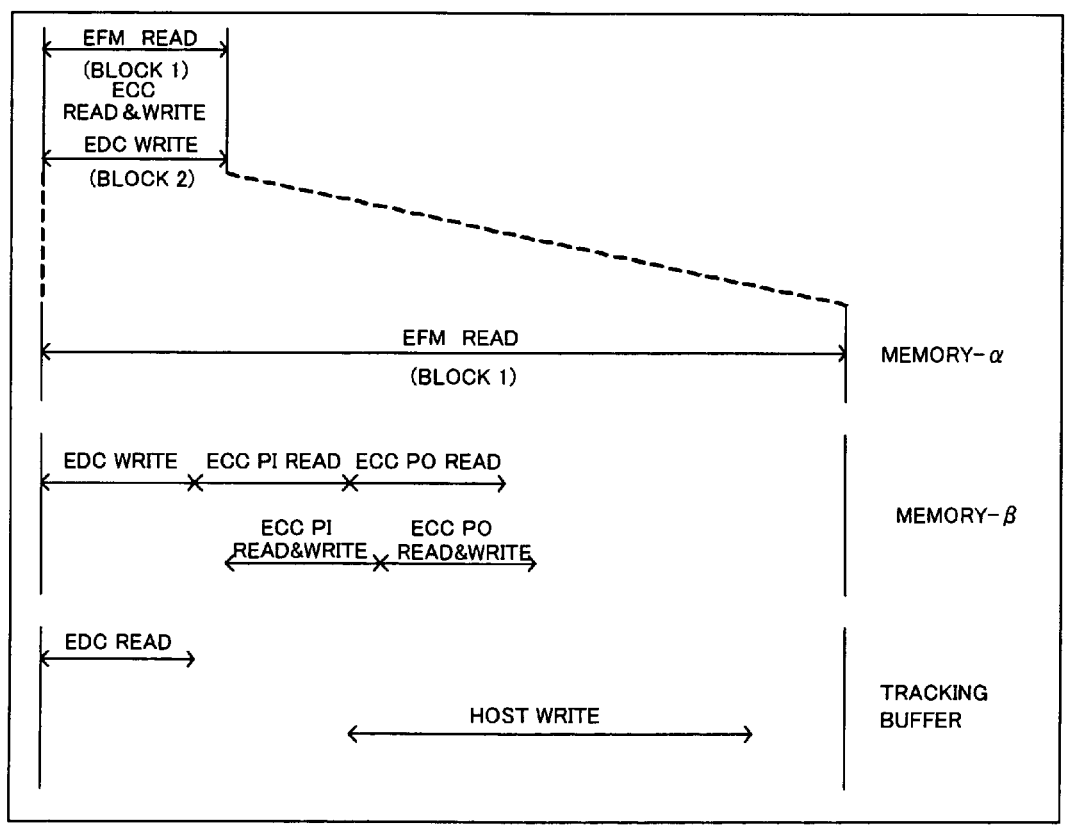
FIG. 37 is a diagram of the state of memory access at the time of encoding of the circuit according to the present embodiment.
Figure 38:
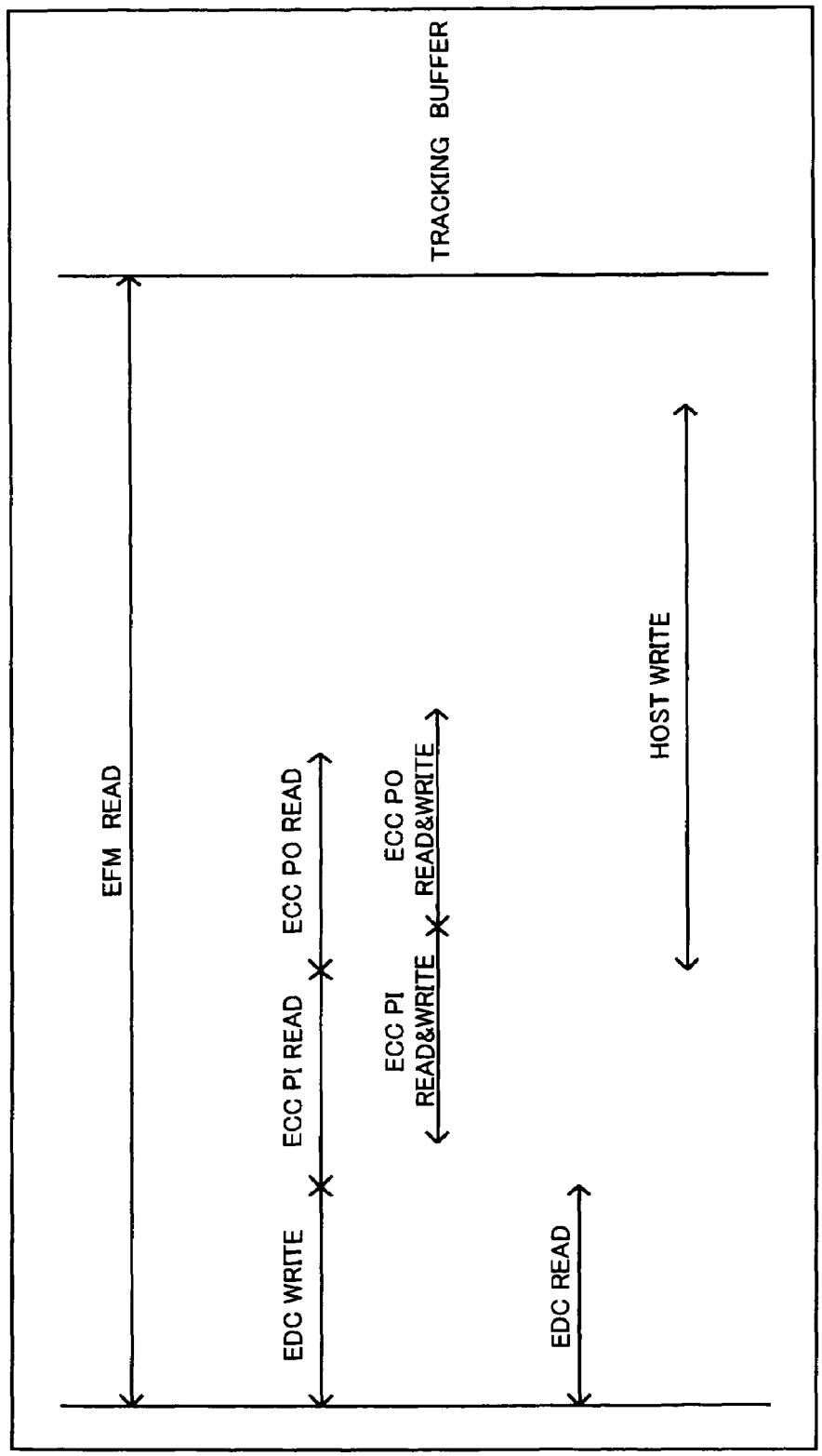
FIG. 38 is a diagram of the state of memory access of the circuit of FIG. 3.

Here, the state of memory access will be compared between the circuit according to the present embodiment and the conventional circuit of FIG. 3. FIG. 37 is a diagram of the state of memory access of the circuit according to the present embodiment; while FIG. 38 is a diagram of the state of memory access of the circuit of FIG. 3. The two diagrams show the situation when the encoding is carried out.

In the conventional circuit of FIG. 38, the single memory is accessed for the EFM-RD, EDC-WR, ECC PI-RD, ECC PO-RD, ECC PI-RD&WR, ECC PO-RD&WR, HOST-WR, EDC-RD, EFM-RD, etc.

As opposed to this, in the circuit according to the present embodiment of FIG. 37, the memory accesses are carried out dispersed to three memories, so the bottleneck of the memory access is eased. In FIG. 37, the memory α is accessed for the EFM-RD, the memory β is accessed for the EDC-WR, ECC PI-RD, ECC PO-RD, ECC PI-RD&WR, and ECC PO-RD&WR, and the tracking buffer 11553 is accessed for the HOST-WR and EDC-RD.

In general, when a memory is accessed overlapping in time, arbitration of the access right to the memory becomes necessary. In that case, overhead occurs accompanied with the access right arbitration. In FIG. 38, all accesses are concentrated at a single memory, so this overhead becomes large.

On the other hand, in FIG. 37, there are few overlapping memory accesses and the overhead is small. When confirming the memory accesses for FIG. 37, the memory α is accessed only for the EFM-RD, so arbitration is not required. The tracking buffer 11553 is only accessed for the EDC-RD and HOST-WR so the number of continuous accesses can be made large and the overhead can be made small. The memory β is accessed for the EDC processing and the ECC processing, but the two processings are sequentially carried out, so arbitration of the access right is not necessary. For the ECC, the code read operation and the parity rewrite processing overlap in time, but there are few accesses for the parity rewrite processing (Read&Write), so the overhead is still small. Further, there are accesses for the codes, but there is almost no overlap in time, so the overhead is still small.

As explained above, according to the present embodiment, at the time of reproducing data, the data in units of blocks after the EFM+demodulation at the EFM+demodulator 1151 supplied through the data path of the bus portion 1156 formed in accordance with the status information ST0 and ST1 is alternately written into the first memory and the second memory, the record data is read from the first memory or the second memory not written in to the error corrector 1153 through the data path of the bus portion 1156 formed in accordance with the status information ST0 and ST1, the data (EDC) during the error correction is written into the first memory or the second memory, and the data after the error correction is stored in the third memory (tracking memory), while at the time of recording data, the user data transferred in units of the blocks from the host apparatus 117 is written into the third memory (tracking memory) serving as the tracking buffer via the bus portion 1156, and, after the start of the encoding, the user data stored in the third memory is read out by the error corrector 1153, the user data, the EDC parity, ID, and the various types of field information scrambled at the error corrector 1153 are alternately written into the first memory and the second memory for every block unit through the data path of the bus portion 1156 formed in accordance with the status information ST0 and ST1, and the data stored in the first memory or the second memory is read out by the EFM modulator 1152. By such a configuration, the following effects can be obtained.

Namely, at the time of the pipeline processing, a memory is shared at each pipeline stage, so there is no memory access for the transfer of data. Further, at the time of the pipeline processing, at a certain time, the memory is occupied by each pipeline stage, therefore there are few memory accesses with respect to one memory. Accordingly, high speed operation is possible, and a lowering of the power consumption is possible. Further, the output stage of the system has a memory acting as a buffer, so even if there is no data request to the system, the pipeline operation is not interrupted and high speed operation is possible. Still further, by replacing only the portion for access to the same buffer memory, a request for change of the size of the memory acting as the buffer unit required for the system according to the purpose can be easily coped with.

Further, according to the present embodiment, the parity extinction pointer generator (PNTGEN) 115312 and the selector 115313 are provided to make the ECC decoder (DEC) and ECC encoder (ENC) be shared, so an error correction code unit can be configured by a minor change with respect to the error correction decoder. As a result, not only an error correction encoder/decoder itself, but also the code data read control circuit and the parity write control circuit of the peripheral circuits thereof can be shared at the time of the encoding/decoding, the circuit scale can be made small, and the system can be realized with a low cost.

Further, the present embodiment is configured so that when storing the data in the first memory 11551 and the second memory 11552, it is encrypted with a predetermined key and stored the encrypted data, while when reading the data, the data is decoded by using the key at the time of the encrypting, therefore even if there is a pipeline stage at which the data is not correctly written, that portion of the data which was not written becomes erroneous data in the other pipeline stages, so will not cause a malfunction. Further, even if an optical disc device has data which is not buffered due to a disturbance of the PLL, a disturbance of the sync protection, etc. at the time of the EFM-WR, no decline of the error correction capability occurs. Further, even if an optical disc device has data which is not buffered due to a disturbance of the PLL, a disturbance of the sync protection, etc. at the time of the EFM-WR, there is the advantage that the EDC check will not incorrectly give a good (OK) result and the data will not be erroneously output to the host apparatus 117.

Summarizing the effects of the invention, as explained above, according to the present invention, even if there is a pipeline stage where the data is not correctly written, that portion of the data which was not written becomes erroneous data in the other pipeline stages, so will not cause a malfunction. Further, even if an optical disc device has data which is not buffered due to a disturbance of the PLL, a disturbance of the sync protection, etc. at the time of the EFM-WR, no decline of the error correction capability occurs. Further, even if an optical disc device has data which is not buffered due to a disturbance of the PLL, a disturbance of the sync protection, etc. at the time of the EFM-WR, there is the advantage that the EDC check will not incorrectly give a good (OK) result and the data will not be erroneously output to the host apparatus.

While the invention has been described with reference to specific embodiments chosen for purpose of illustration, it should be apparent that numerous modifications could be made thereto by those skilled in the art without departing from the basic concept and scope of the invention.

The invention claimed is:

1. A pipeline processing system applying pipeline processing on data, comprising:
    a plurality of processing circuits arranged as pipeline stages;
    a memory including at least one portion able to store a block quantity of data that is processed in one pipeline stage prior to processing of another block of data stored in the portion;
    a second memory portion able to store a block quantity of data that is processed in one pipeline stage prior to processing of another block of data stored in the portion; and
    an encrypting circuit for encrypting data and further wherein.

2. A pipeline processing system as set forth in claim 1, further comprising a decoding circuit for decoding data based on information used for encrypting when reading out the data.

3. A pipeline processing system as set forth in claim 1, further comprising a means for switching data paths between said plurality of processing circuits and the memory portions in accordance with predetermined status information.

4. A pipeline processing system as set forth in claim 3, wherein said means for switching data paths switches said data paths in accordance with status information transitioning according to the state of processing of at least one processing circuit.

5. A pipeline processing system as set forth in claim 1, further comprising a circuit for outputting stored data from a memory storing data after pipeline processing in accordance with a request of the system.

6. A pipeline processing system as set forth in claim 1, further comprising a circuit for storing data before the start of pipeline processing in a predetermined memory of said memory portion in accordance with a request of the system.

7. A pipeline processing system as set forth in claim 1, further comprising a circuit for outputting stored data from a memory storing data after pipeline processing in accordance with a request of the system.

8. An information processing apparatus for reading recorded data from a recording medium, comprising:
    a demodulation circuit demodulating said read data;
    an error processing circuit performing predetermined error processing with respect to the data after said demodulation;
    a memory portion including at least one memory able to store data having a quantity of data required in at least one pipeline stage and accessed by any circuit of said demodulation circuit or the error processing circuit; and
    an encrypting circuit for encrypting data when the processing results of said demodulation circuit and error processing circuit are stored in said memory portion.

9. An information processing apparatus as set forth in claim 8, further comprising a decoding circuit for decoding data based on set information used for the encrypting when reading out the data.

10. An information processing apparatus as set forth in claim 8, further comprising means for switching data paths between said demodulation circuit and error processing circuit and memories of said memory portion in accordance with predetermined status information transitioning in accordance with the state of processing of at least one circuit among said demodulation circuit and error processing circuit.

11. An information processing apparatus as set forth in claim 10, wherein said means for switching data paths switches said data paths in accordance with status information transitioning according to the state of processing of at least one circuit among said demodulation circuit and error processing circuit and transfers data between pipeline states.

12. An information processing apparatus as set forth in claim 8, further comprising an interface circuit for outputting stored data from a memory storing data after pipeline processing in accordance with a request of the system.

13. An information processing apparatus for recording input data as data of a predetermined format into a storage media, comprising:
    a recording data preparation circuit for preparing data to be recorded;
    a modulation circuit modulating data prepared by the recording data preparation circuit, and outputting the same as the recording data to said medium;

a memory including at least one memory portion able to store a block quantity of data that is processed by a pipeline stage prior to processing of another block of data stored in the portion; a second memory portion able to store a block quantity of data that is processed in one pipeline stage prior to processing of another block of data stored in the portion; and an encrypting circuit for encrypting the data.

14. An information processing apparatus as set forth in claim 13, further comprising a decoding circuit for decoding data based on set information used for the encrypting when reading out the data encrypted and stored in said memories to said modulation circuit or recording data preparation circuit.

15. An information processing apparatus as set forth in claim 13, further comprising a means for switching data paths between said demodulation circuit and recording data preparation circuit in accordance with predetermined status information.

16. An information processing apparatus as set forth in claim 15, wherein said means for switching data paths switches said data paths in accordance with status information transitioning according to the state of processing of at least one circuit among said demodulation circuit and recording data preparation circuit.

17. An information processing apparatus for recording input data as data of a predetermined format into a storage media, comprising:

a recording data preparation circuit for preparing the data to be recorded;

a modulation circuit modulating data prepared by the recording data preparation circuit, and outputting the same as the recording data to said medium;

a memory including at least one memory portion able to store a block quantity of data that is processed by a pipeline stare prior to processing of another block of data; a second memory portion able to store a block quantity of data that is processed in one pipeline stage prior to processing of another block of data; and an encrypting circuit for encrypting the data;

further comprising an interface circuit for storing data before the start of pipeline processing to a predetermined memory of said memory portion in accordance with a request of the system.

18. An information processing apparatus for reading recorded data from a recording medium that is stored in a predetermined format and recording input data as data of a predetermined format into the medium, comprising:

a demodulation circuit for demodulating data;

an error processing circuit performing predetermined error processing with respect to said data after demodulation;

a recording data preparation circuit preparing data to be recorded;

a modulation circuit modulating said prepared recording data, and outputting the same as the recording data to said medium;

a memory portion including at least one memory able to store data having a quantity required in at least each pipeline stage and accessed by any circuit of said demodulation circuit, error processing circuit, recording data preparation circuit, and modulation circuit; and an encrypting circuit for encrypting data.

19. An information processing apparatus as set forth in claim 18, further comprising a decoding circuit for decoding data based on information used for the encrypting when reading out the data encrypted and stored in said memories.

20. An information processing apparatus as set forth in claim 18, further comprising a means for switching data paths between said demodulation circuit and error processing circuit or said recording data preparation circuit and modulation circuit and a plurality of memories of said memory portion in accordance with predetermined status information.

21. An information processing apparatus as set forth in claim 20, wherein said means for switching data paths switches said data paths in accordance with status information transitioning according to the state of processing of at least one circuit among said demodulation circuit and error processing circuit or said recording data preparation circuit and modulation circuit.

22. An information processing apparatus as set forth in claim 20, further comprising an interface circuit for outputting stored data from a memory storing data after pipeline processing in accordance with a request of the system.

* * * * *